United States Patent
Levy et al.

(10) Patent No.: US 10,789,602 B2
(45) Date of Patent: Sep. 29, 2020

(54) SYSTEM AND METHOD FOR GATHERING, IDENTIFYING AND ANALYZING LEARNING PATTERNS

(71) Applicants: Michael Levy, Tel Aviv (IL); Avishai Erell, Ramat Hasharon (IL); Igor Goldberg, Tel Aviv (IL)

(72) Inventors: Michael Levy, Tel Aviv (IL); Avishai Erell, Ramat Hasharon (IL); Igor Goldberg, Tel Aviv (IL)

(*) Notice: Subject to any disclaimer, the term of this patent is extended or adjusted under 35 U.S.C. 154(b) by 1207 days.

(21) Appl. No.: 14/301,531

(22) Filed: Jun. 11, 2014

(65) Prior Publication Data
US 2015/0363795 A1 Dec. 17, 2015

(51) Int. Cl.
*G06Q 30/02* (2012.01)
*G06Q 50/20* (2012.01)

(52) U.S. Cl.
CPC ........ *G06Q 30/0201* (2013.01); *G06Q 50/20* (2013.01)

(58) Field of Classification Search
CPC ..... G09B 19/00; G06Q 30/0201; G06Q 50/20
USPC .................. 705/326–328; 434/433
See application file for complete search history.

(56) References Cited

U.S. PATENT DOCUMENTS

| | | | |
|---|---|---|---|
| 8,628,331 B1* | 1/2014 | Wright | G09B 19/00 434/107 |
| 9,626,875 B2* | 4/2017 | Gal | G09B 5/08 |
| 2002/0132213 A1* | 9/2002 | Grant | G09B 5/00 434/322 |
| 2002/0197594 A1* | 12/2002 | Dickmeyer | G09B 7/00 434/322 |
| 2004/0018479 A1* | 1/2004 | Pritchard | G09B 5/00 434/350 |
| 2014/0170626 A1* | 6/2014 | Lovett | G06Q 10/10 434/350 |

(Continued)

OTHER PUBLICATIONS

Kristiansen et al. A comprehensive study of educational timetabling, a survey. DTU Management Engineering. Nov. 2013. [Retrieved on: Apr. 9, 2018]. Retrieved from internet: <URL:http://orbit.dtu.dk/fedora/objects/orbit:126108/datastreams/file_ eaf7955a-7a9a-433e-b7aa-dfe50409fd3a/content>. (Year: 2013).*

(Continued)

*Primary Examiner* — Tamara Griffin
(74) *Attorney, Agent, or Firm* — Browdy and Neimark, P.L.L.C.

(57) ABSTRACT

The present invention describes a community based computerized method and system which automatically gathers, acquires and collects students' usage data in a dynamic knowledge base as they perform their routine learning assignments from any educational source (e.g. printed textbooks, e-textbook etc.), for the purpose of assessing their achievements, competencies, areas of interest, preferences and requirements, and then providing automatically generated students-related information and services which are based on this knowledge, such as custom study guides, preparation plans for exams and academic skills assessment reports. The system also provides insights, trends and behavioral patterns within students' groups, which are identified and deduced from actual activities of users, such as learning habits, areas of interest, and demand for new and existing educational learning sources.

3 Claims, 25 Drawing Sheets

System Overview

(56) References Cited

U.S. PATENT DOCUMENTS

2015/0302352 A1\* 10/2015 Le Chevalier ......... G06Q 10/10
705/327

OTHER PUBLICATIONS

Nielsen. How to crawl a quarter billion webpages in 40 hours. michaelnielsen.org. Aug. 10, 2012. [Retrieved on: Dec. 19, 2019]. Retrieved from internet: <URL:http://www.michaelnielsen.org/ddi/how-to-crawl-a-quarter-billion-webpages-in-40-hours/>. entire document (Year: 2012).\*

Google. Crawl and Index > Crawl Schedule. Google Help Center. Nov. 2, 2012. [Retrieved on: Dec. 19, 2019]. Retrieved from internet: <URL:https://web.archive.org/web/20121102033623/https://www.google.com/support/enterprise/static/gsa/docs/admin/70/admin_console_help/crawl_fullcrawlsched.html>. (Year: 2012).\*

Olston et al. Web Crawling. stanford.edu. 2010. [Retrieved on: Dec. 19, 2019]. Retrieved from internet: <URL:http://infolab.stanford.edu/-oston/publications/crawling_survey.pdf>. entire document (Year: 2010).\*

Castillo et al. Scheduling Algorithms for Web Crawling. web.archive.org. Aug. 17, 2011. [Retrieved on: Dec. 19, 2019]. Retrieved from internet: <URL:https://web.archive.org/web/20110817162656/https://chato.cl/papers/castillo04_scheduling_algorithms_web_crawling.pdf>. entire document (Year: 2011).\*

Microsoft. [MS-SRCHTP]: Search Topology Protocol Specification. Jul. 16, 2012. [Retrieved on: Dec. 19, 2019]. Retrieved from internet: <URL:https://interoperability.blob.core.windows.net/files/Archive_SharePoint/%5BMS-SRCHTP%5D.pdf>. entire document (Year: 2012).\*

\* cited by examiner

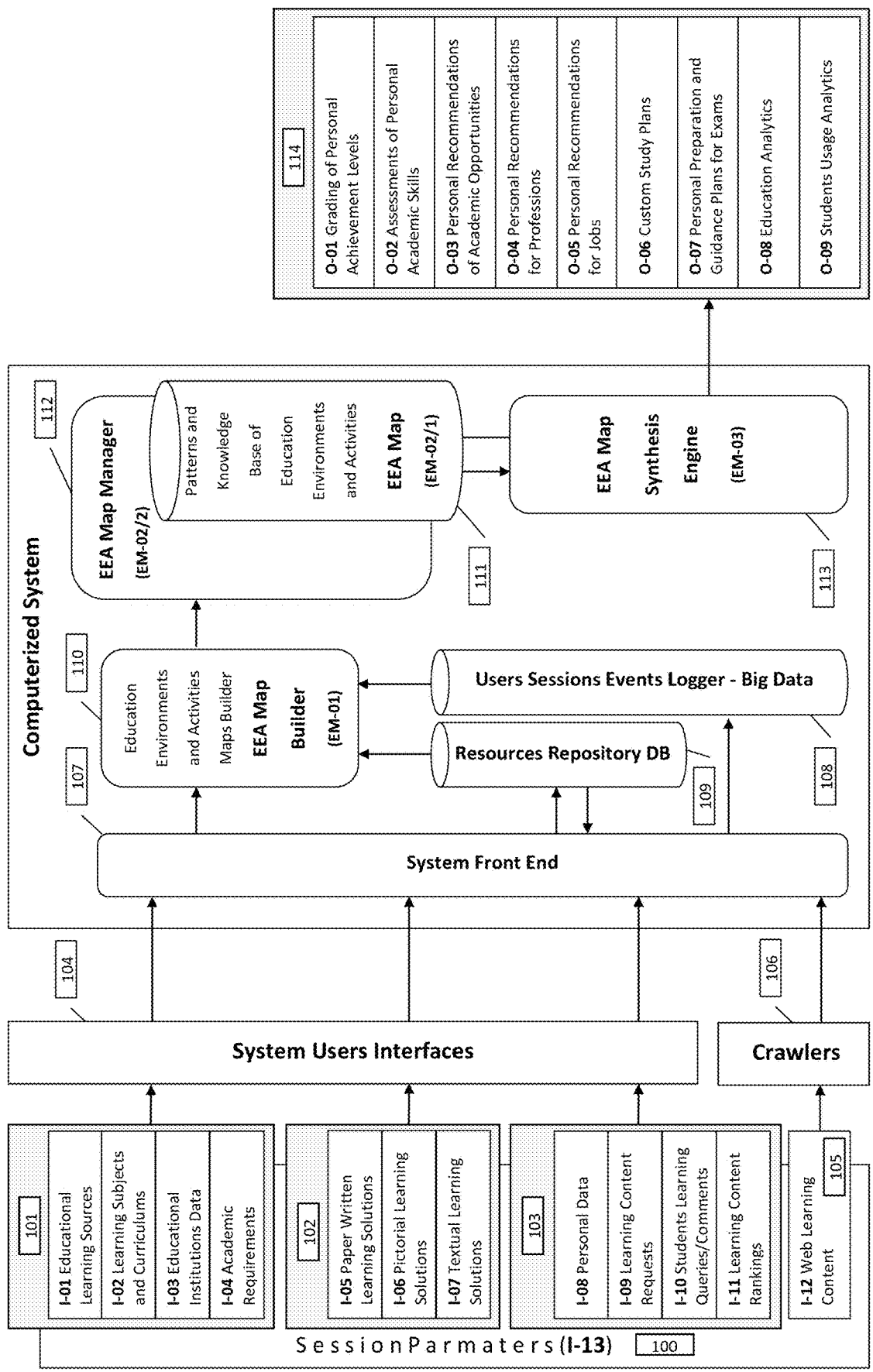
Figure 1 - System Overview

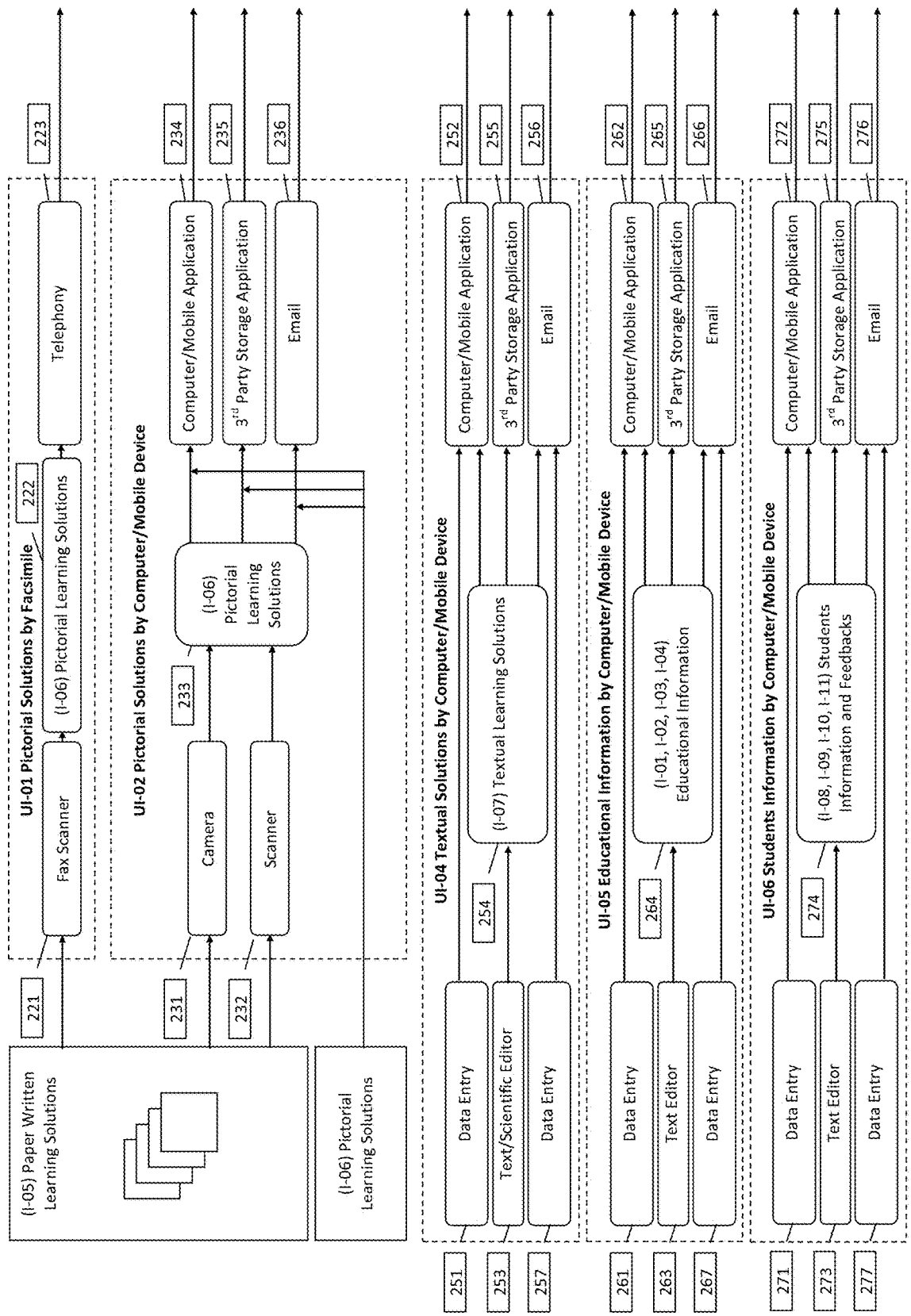
Figure 2 - System Users Interfaces

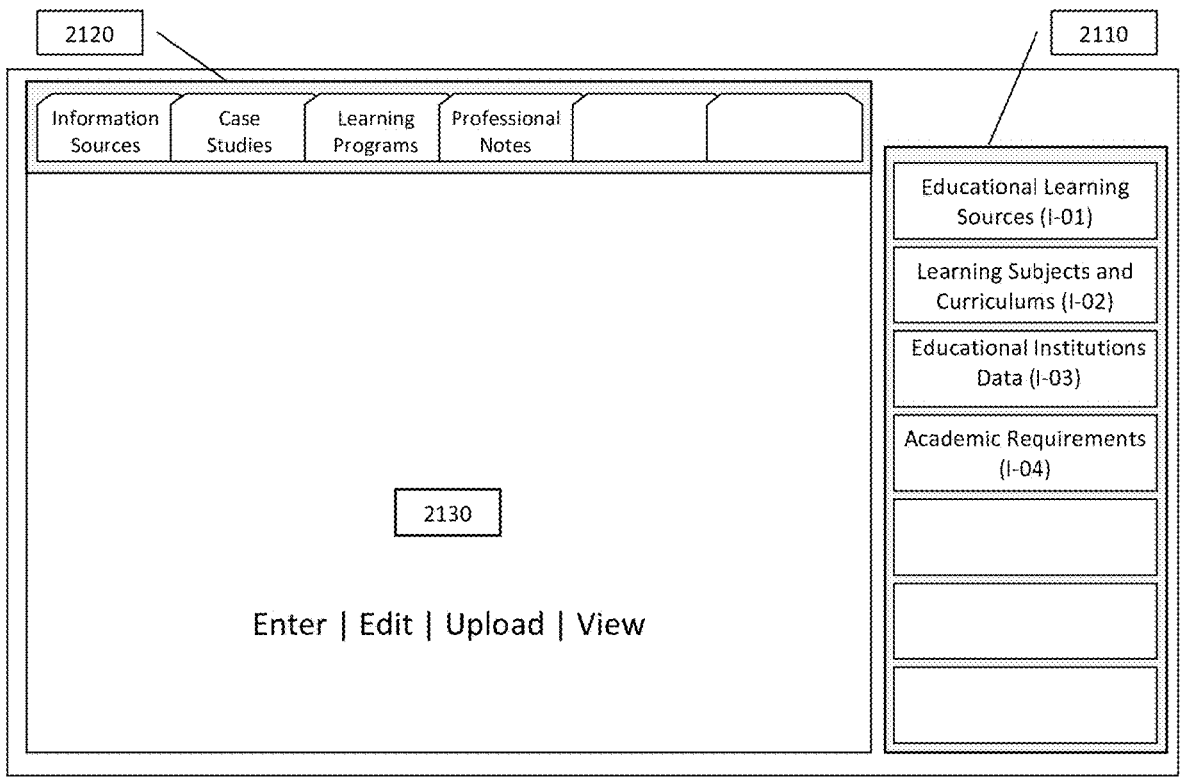
Figure 2.1 - Dedicated applications for Uploading, Entering, Updating, Editing and Viewing Educational Information from a Computer
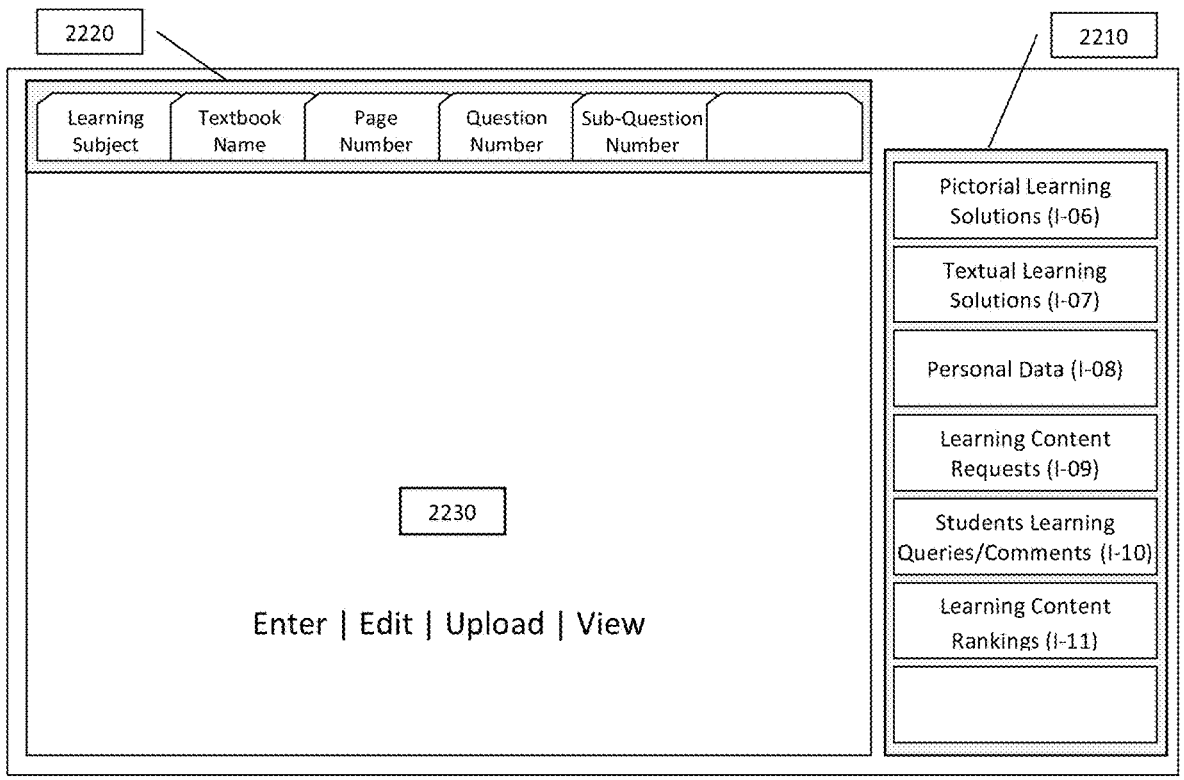
Figure 2.2 - Dedicated applications for Uploading, Entering, Updating, Editing and Viewing Students Information from a Computer

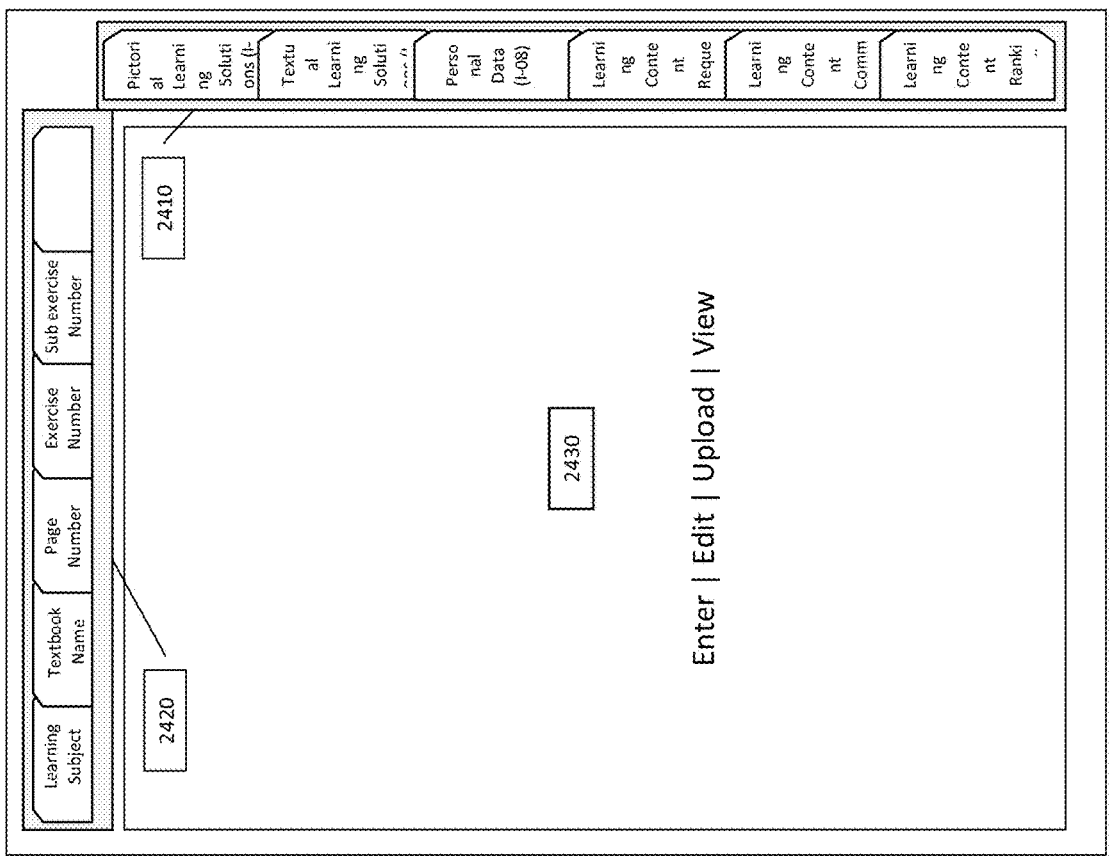
Figure 2.4 - Dedicated applications for Uploading, Entering, Updating, Editing and Viewing Students Information from a Mobile Device
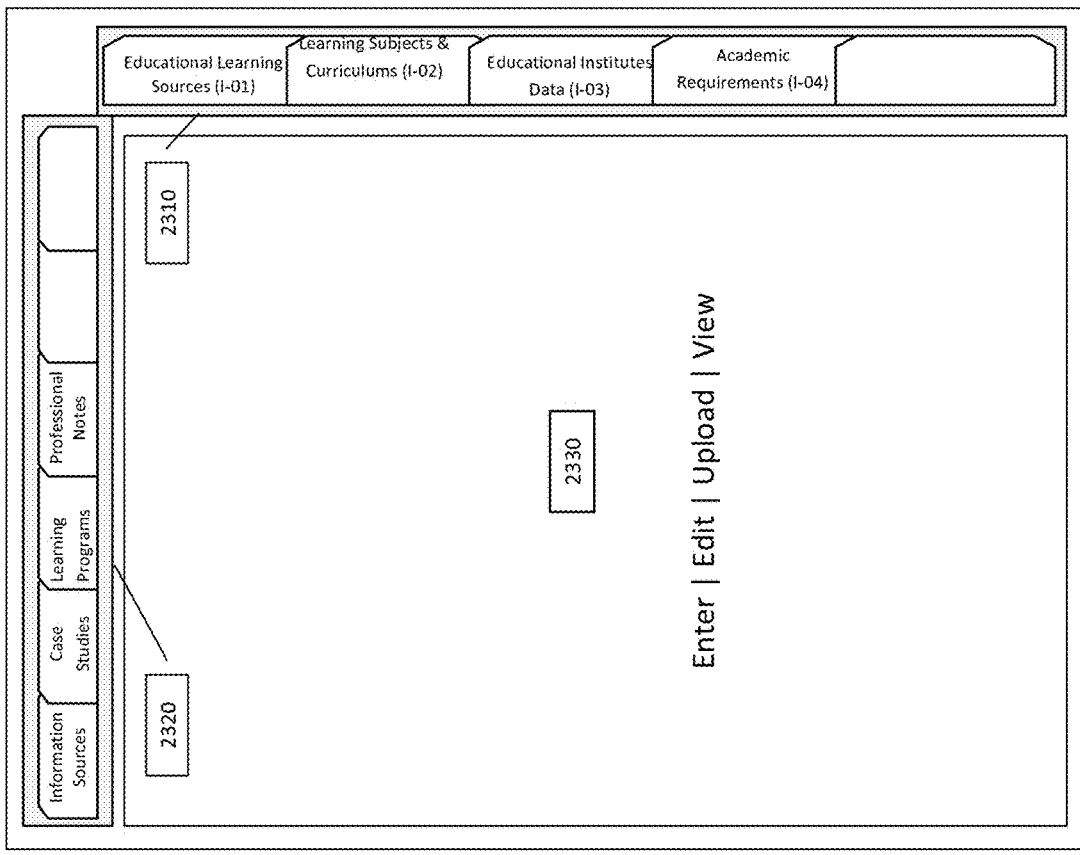
Figure 2.3 - Dedicated applications for Uploading, Entering, Updating, Editing and Viewing Educational Information from a Mobile Device

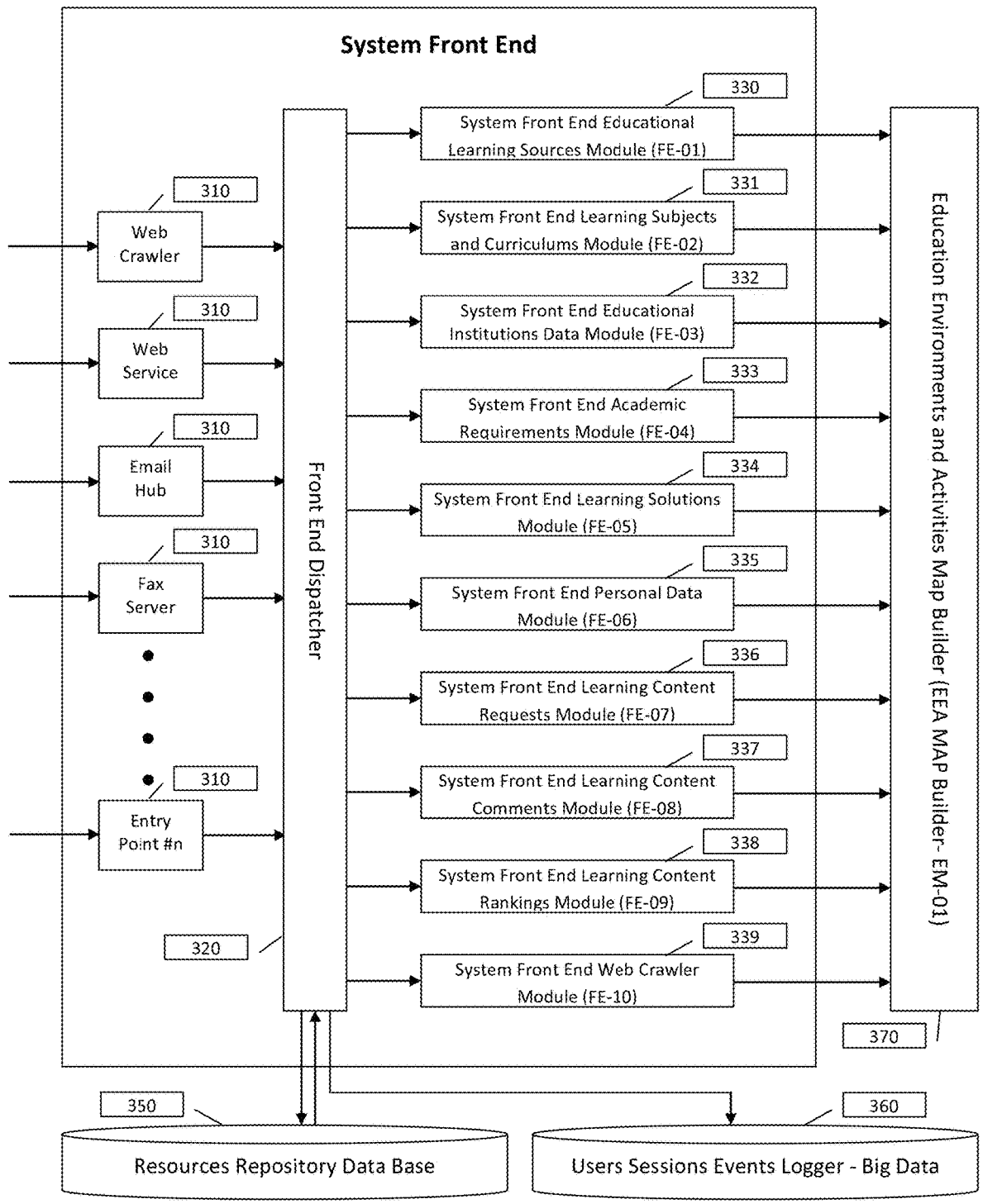
Figure 3 - System Front End

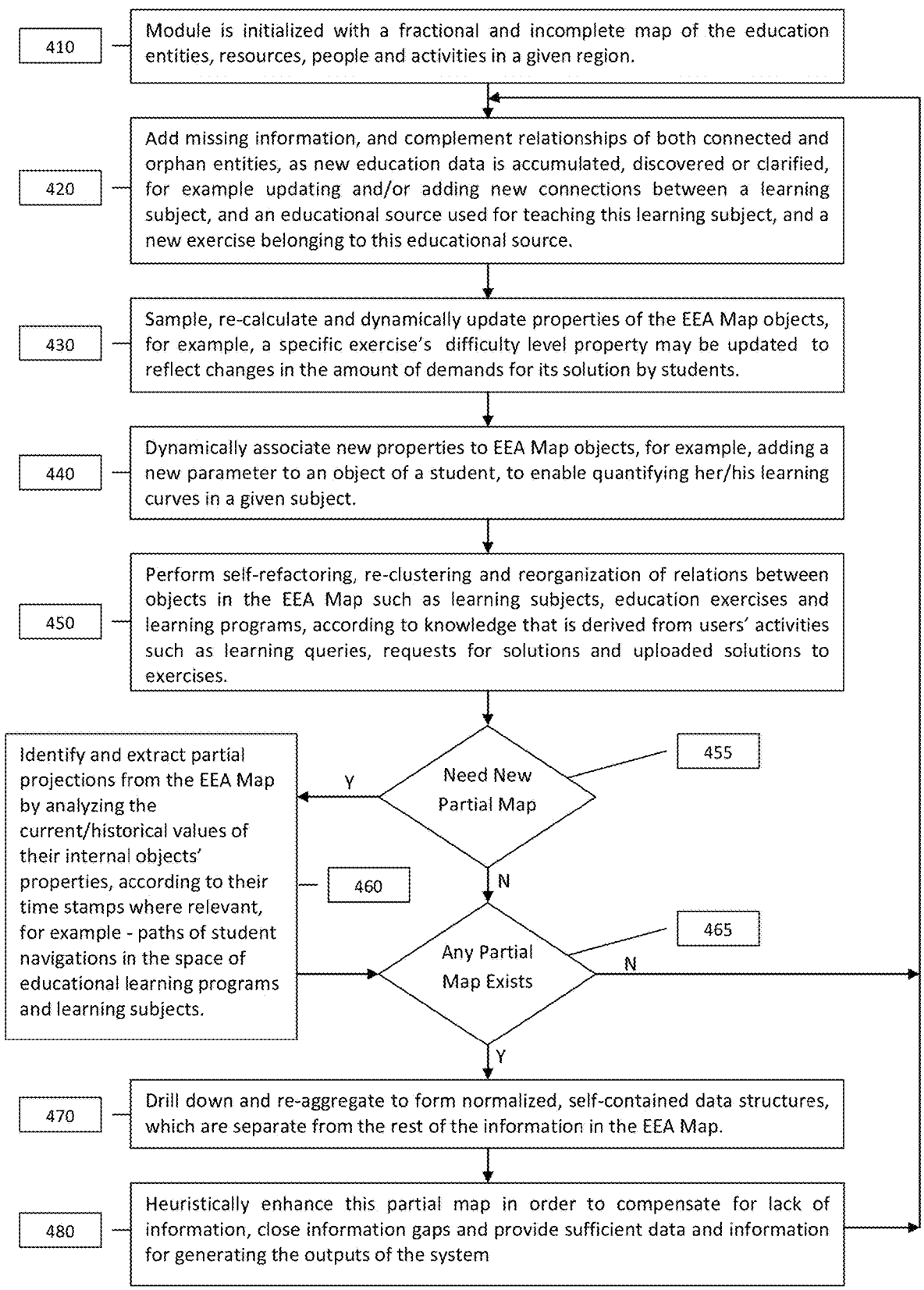
Figure 4.0 - Flow diagram of the internal logic and processes of the Education Environments and Activities Map Manager - EEA Map Manager (EM-02/2) module

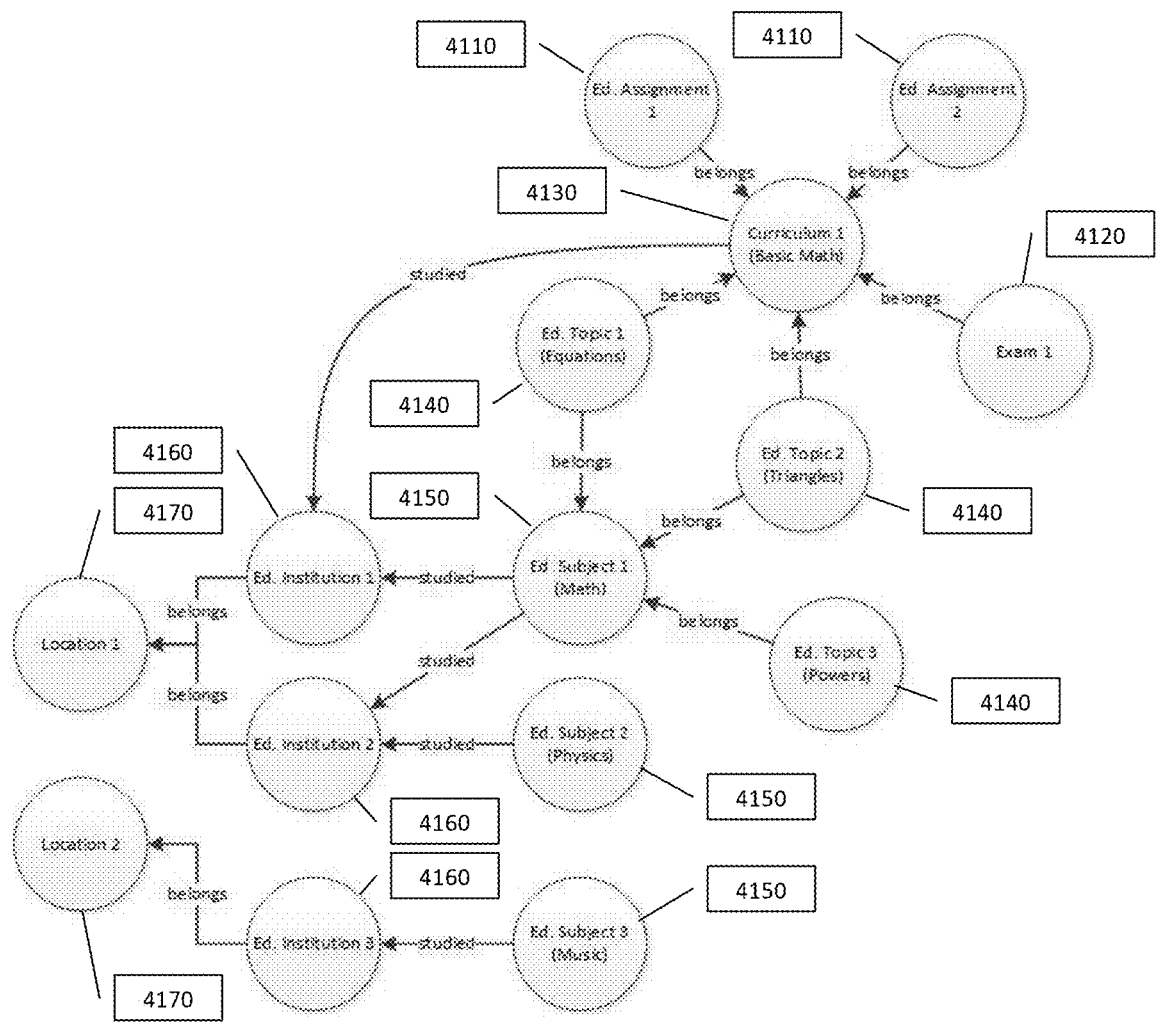
Figure 4.1 - Example of a Partial EEA Map depicting the data and knowledge regarding the structure of specified Educational Organizations and Education Subjects

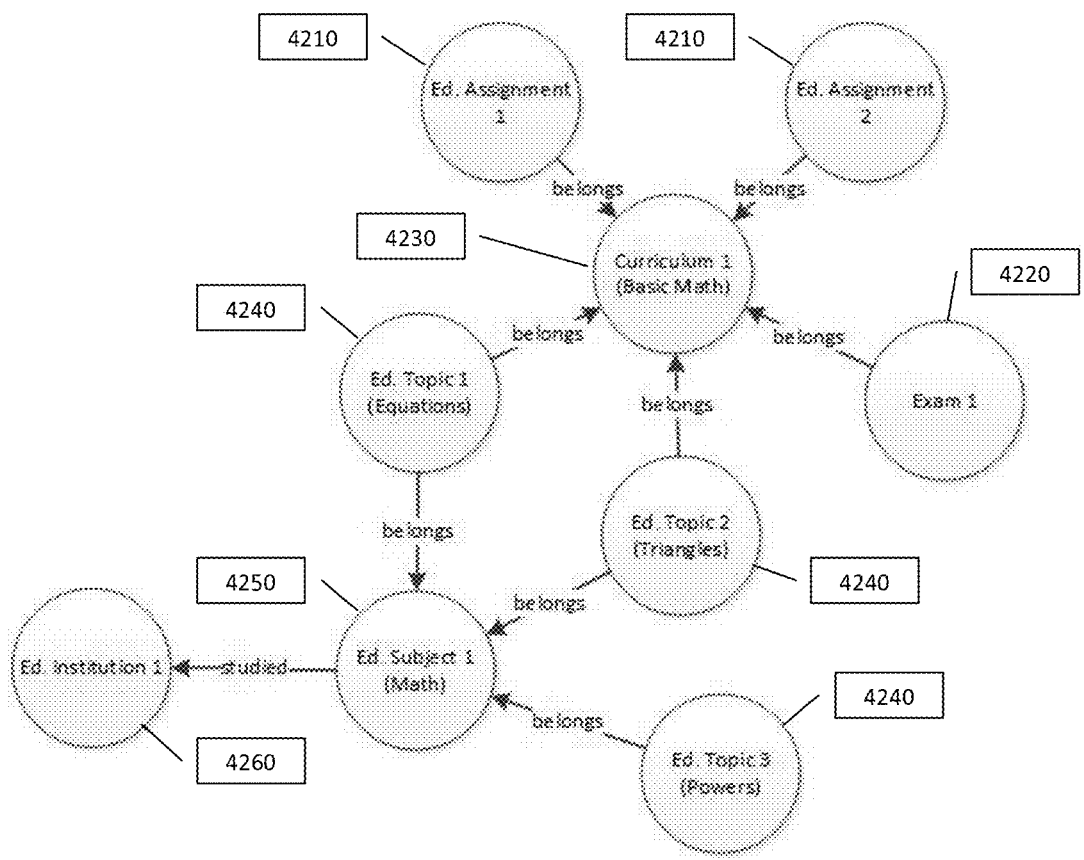
Figure 4.2 - Example of a Partial EEA Map depicting the data and knowledge regarding the structure of specified Learning Processes as Planned by a specified Organization (Education Subjects and Curriculums, Academic Requirements etc.)

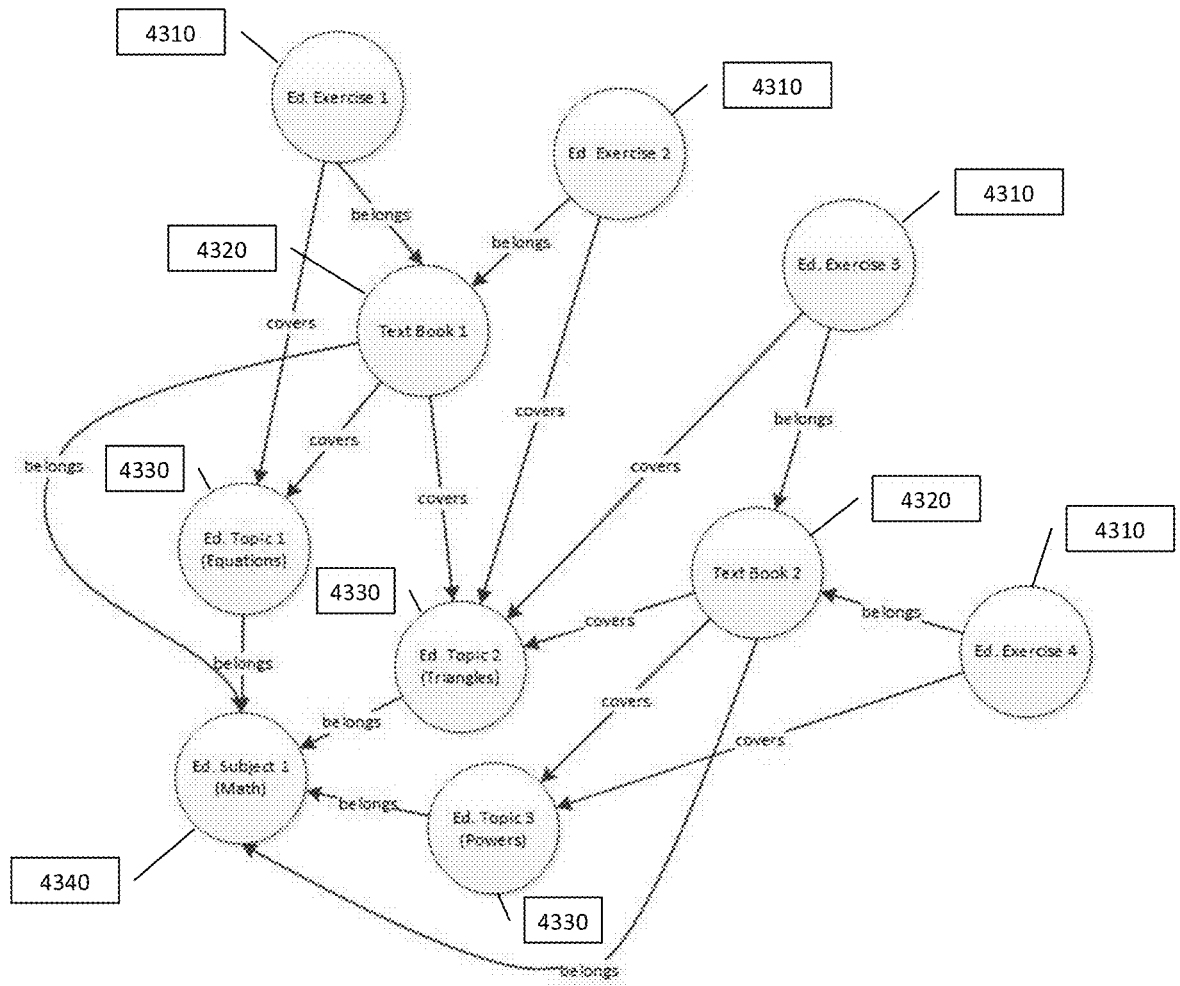
Figure 4.3 - Example of a Partial EEA Map depicting the data and knowledge regarding the structure of a specified Learning Subject and Educational Learning Sources (Text Books, Educational Exercises, Paper Written Learning Solutions, Pictorial Learning Solutions, Textual Learning Solutions)

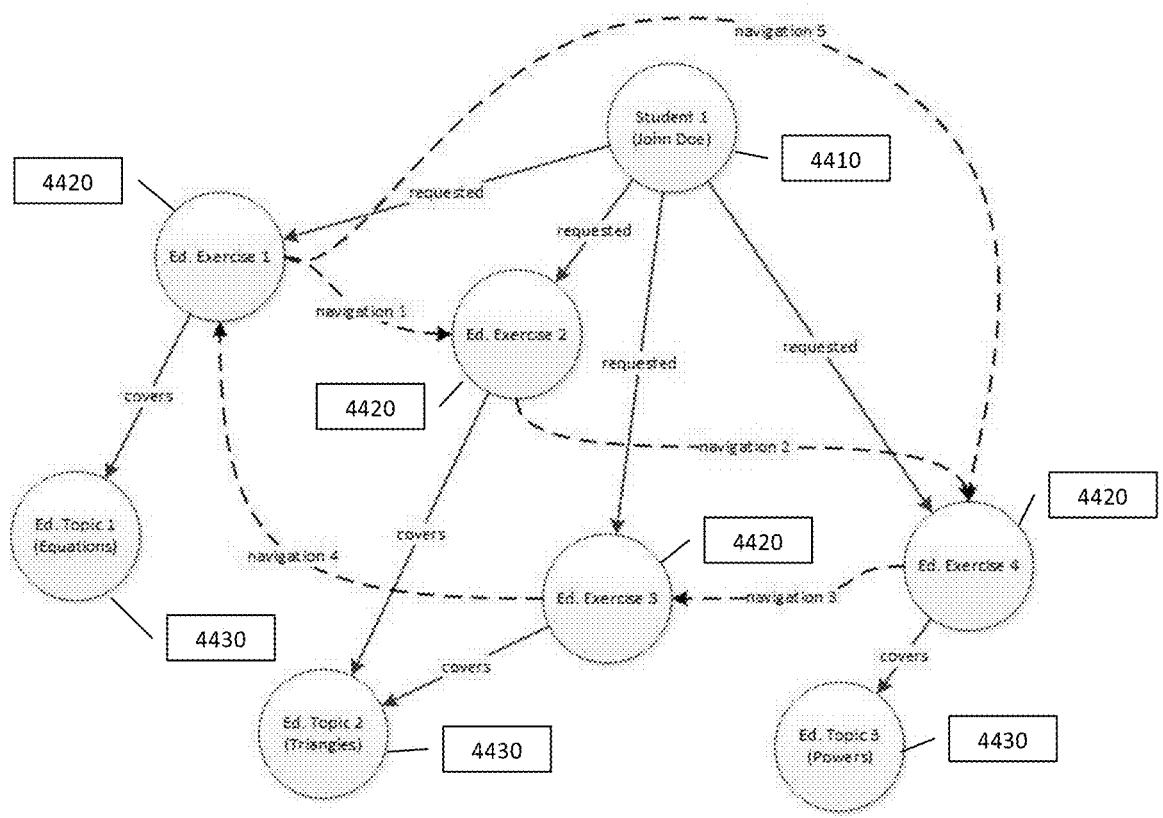
Figure 4.4 - Example of a Partial EEA Map depicting the data and knowledge regarding the structure of Actual Learning Processes as Performed by a specified student (Student Navigation)

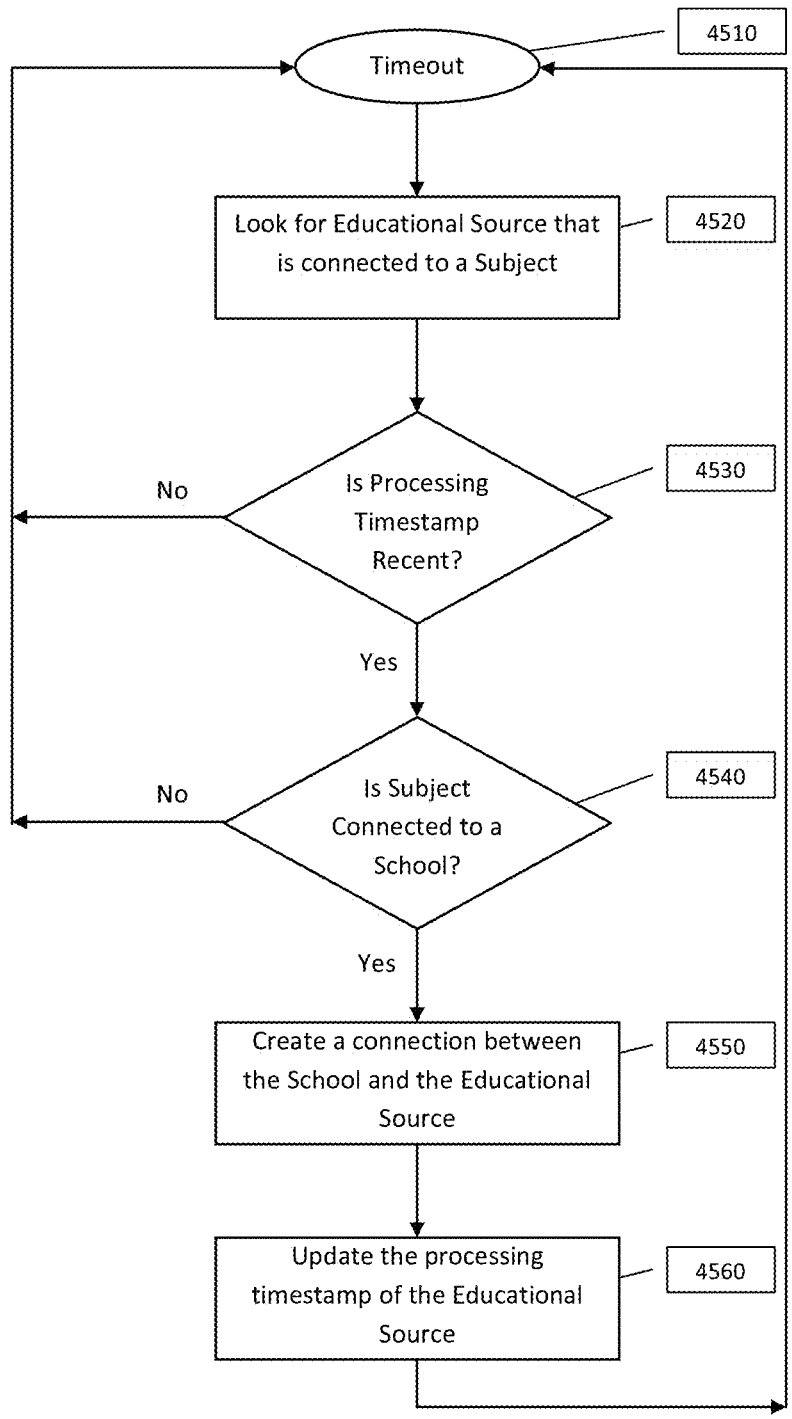
Figure 4.5 - flow diagram for enhancing an Educational Source in an EEA Map

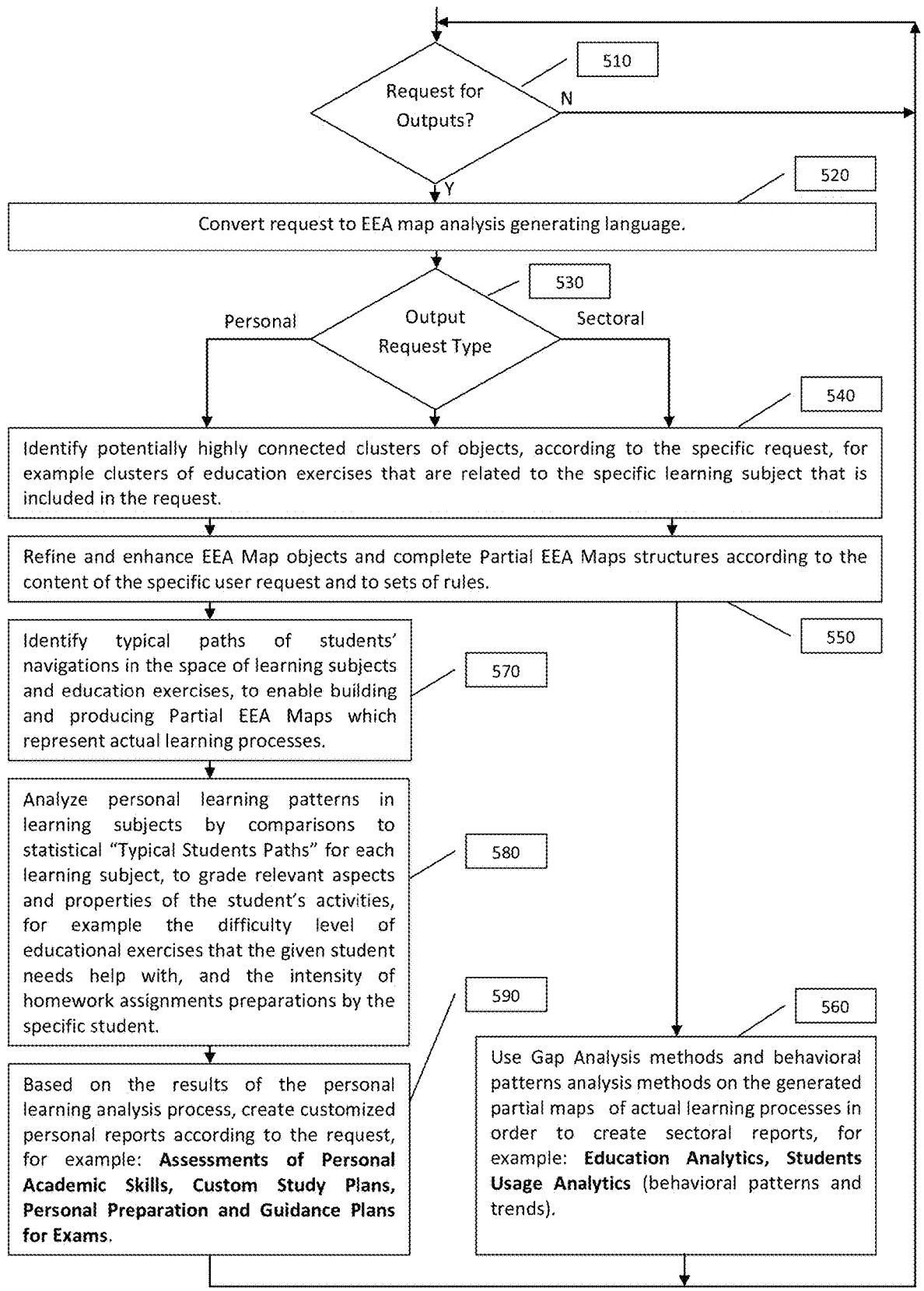
Figure 5.0 - Flow diagram of the internal logic and processes of the EEA Map Synthesis Engine (EM-03) module

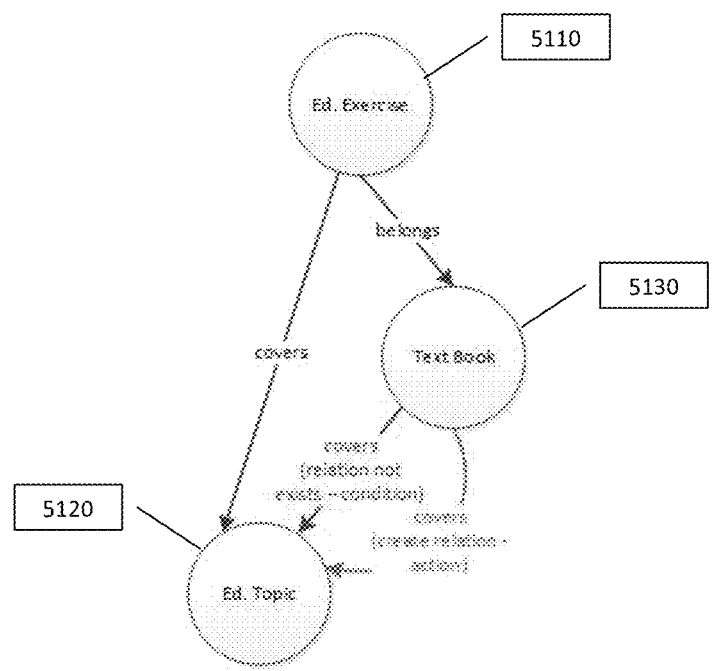
Figure 5.1 - Example of a simple graph pattern that depicts rule based recognition of missing relation that results in a *"create relation"* action

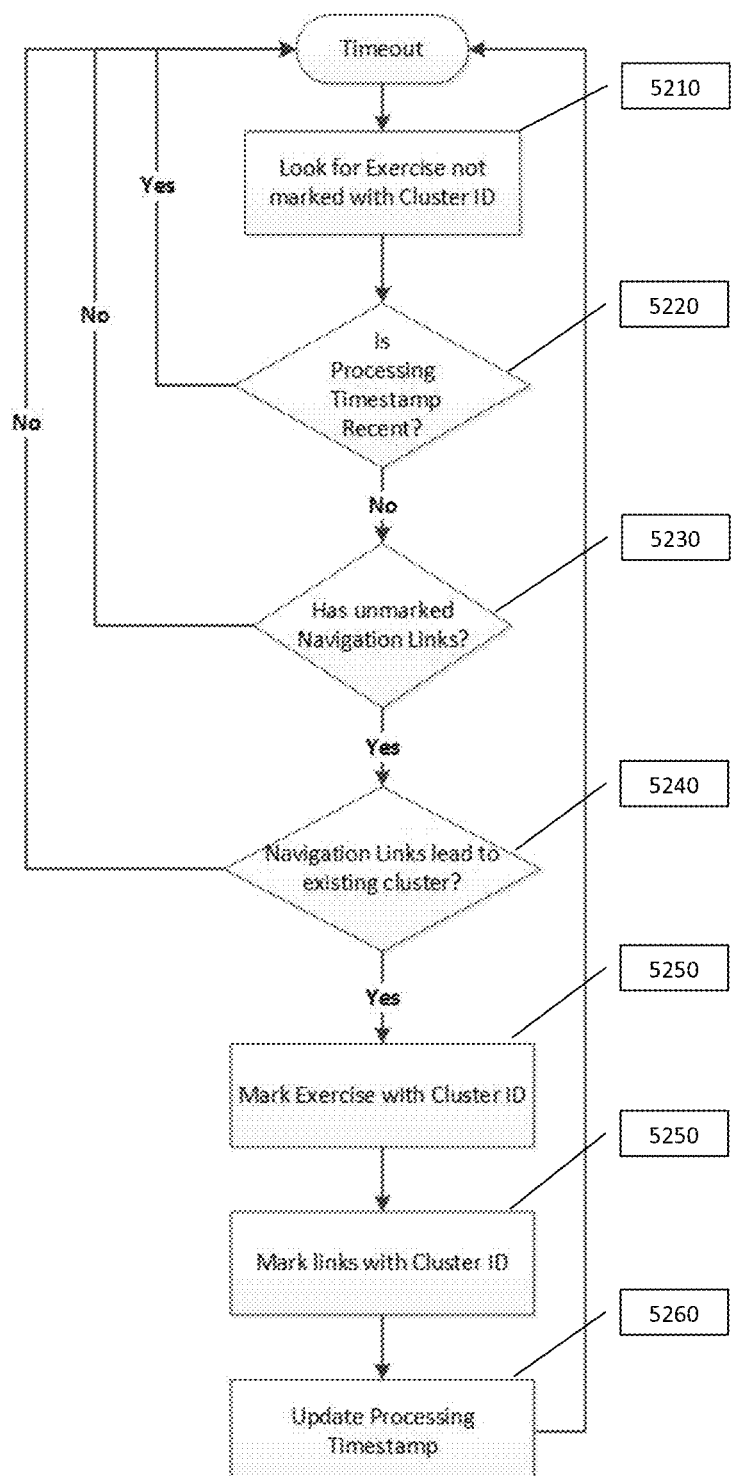
Figure 5.2 – flow diagram for adding an unmarked educational exercise and to an existing cluster

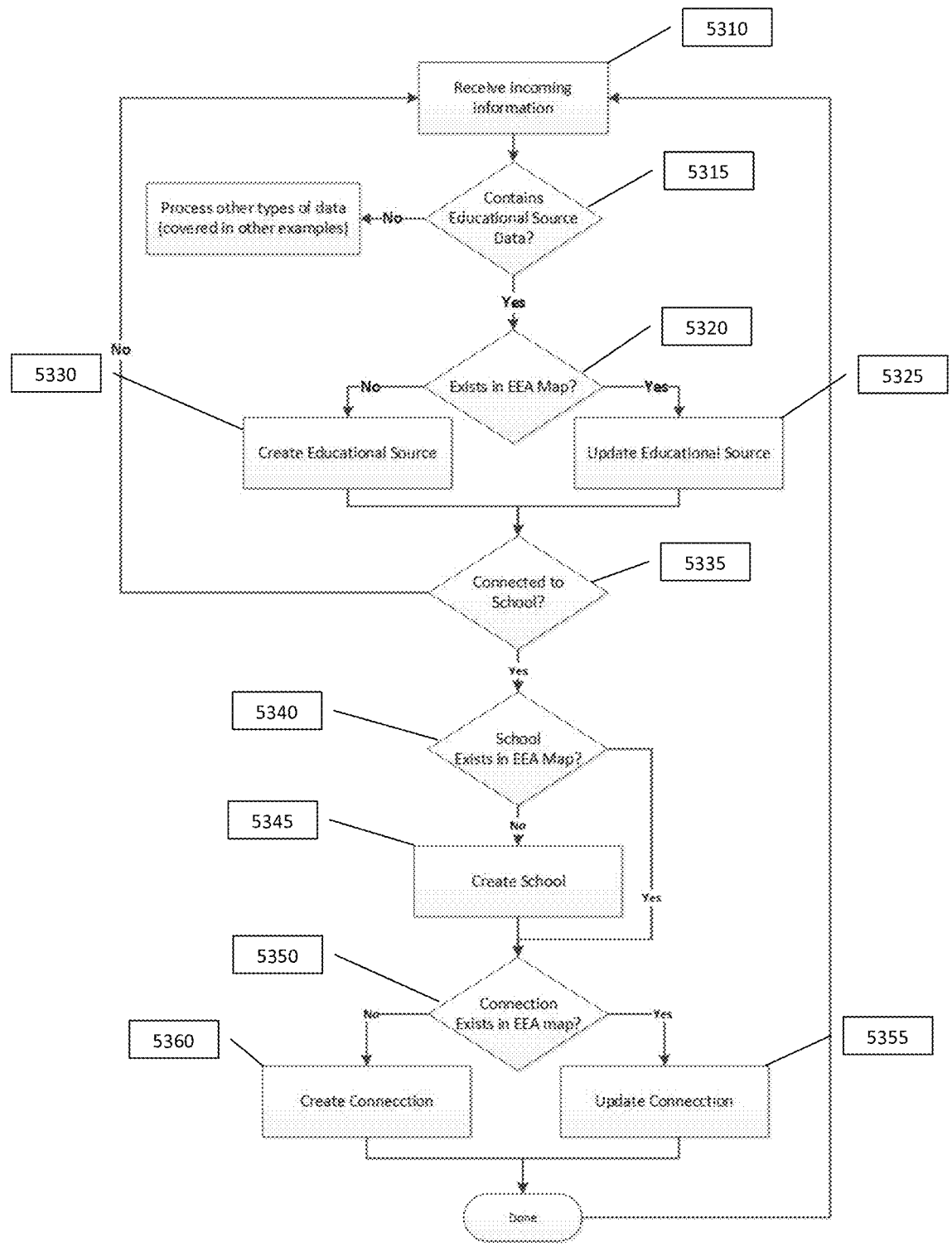
Figure 5.3 - flow diagram for processing incoming Educational Source data in an EEA Map

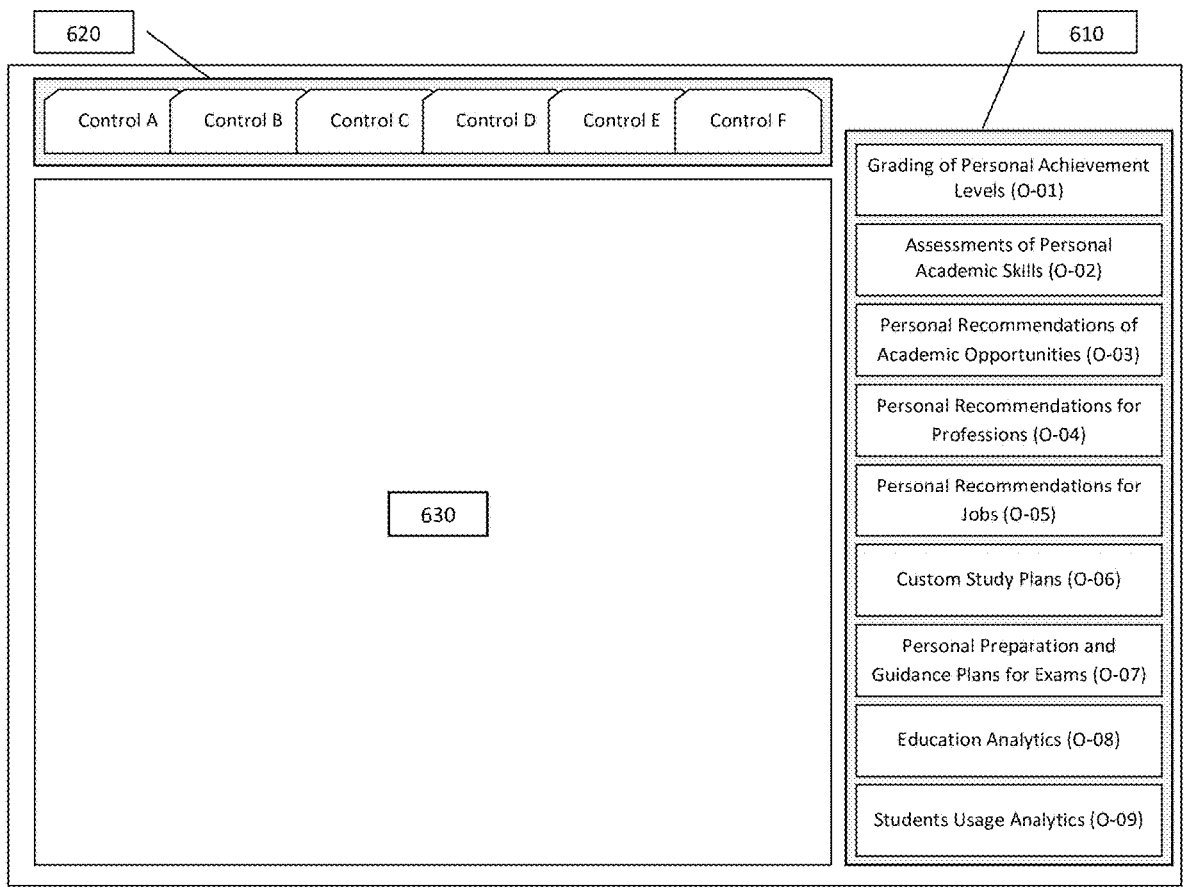
Figure 6 - System Outputs Controls

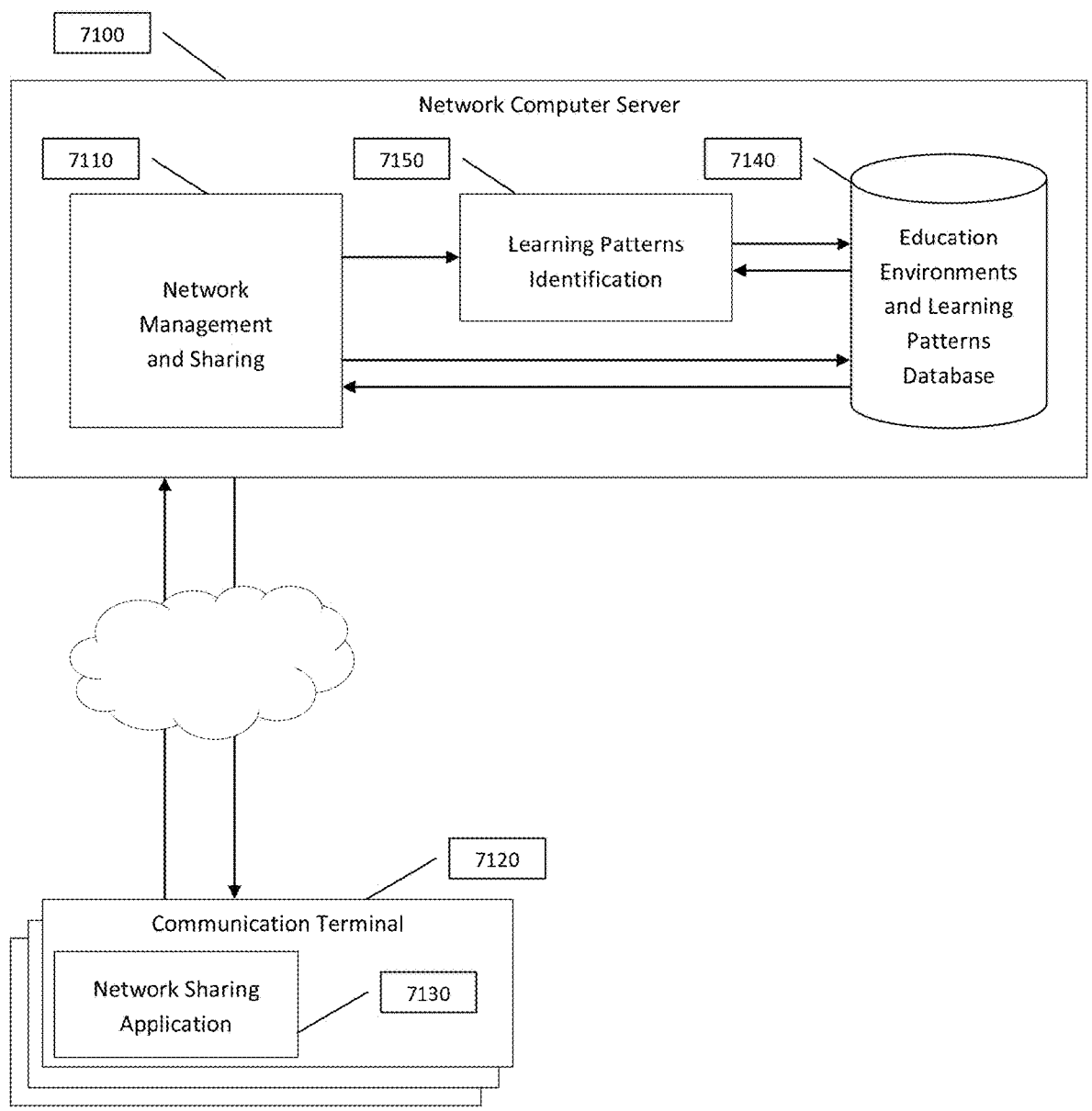
Figure 7.1 – Overview of a computerized system for aggregating queries and solutions and identifying behavioral education learning process of students

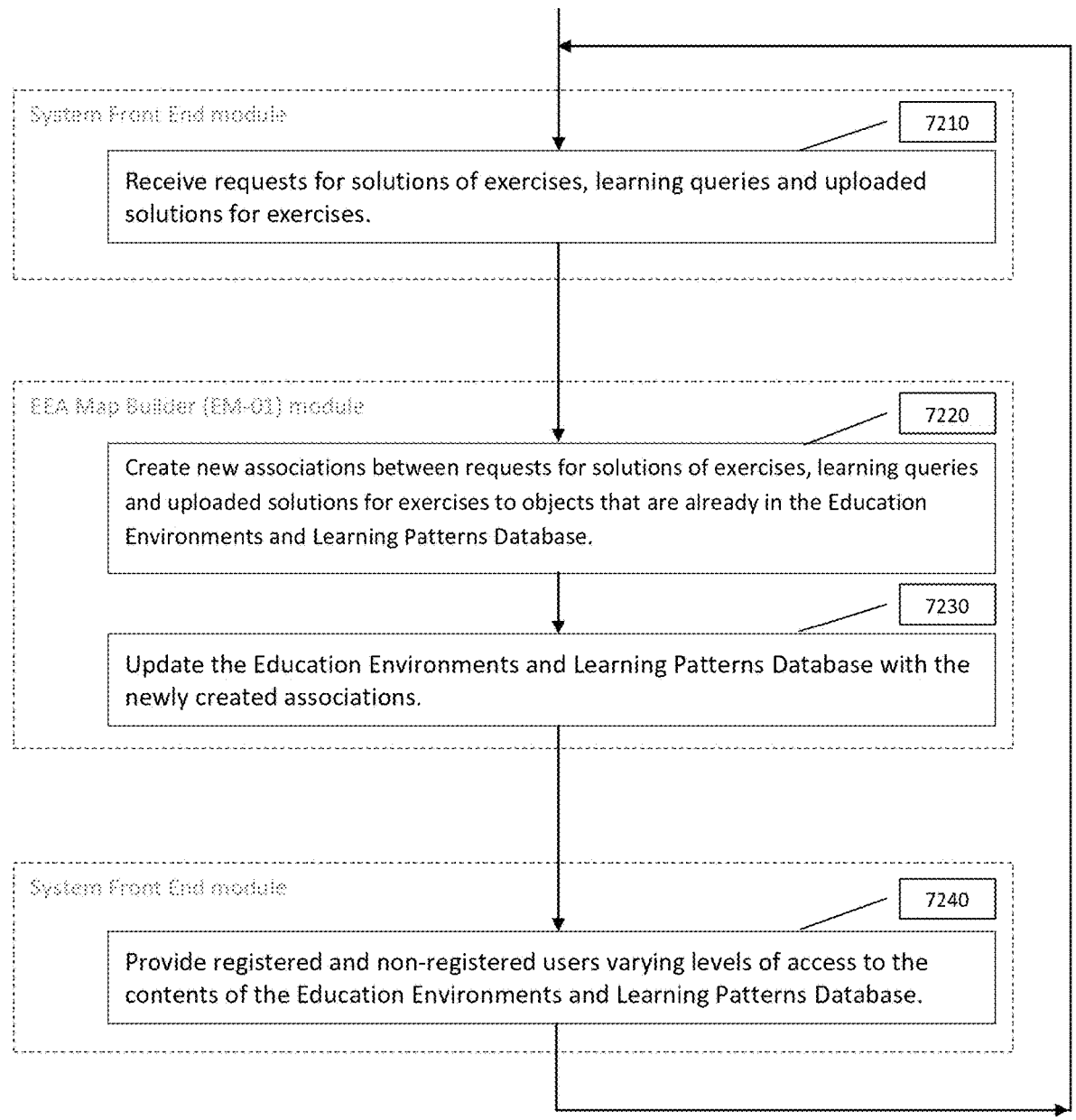
Figure 7.2 – Network Management and Sharing processes, flow diagram

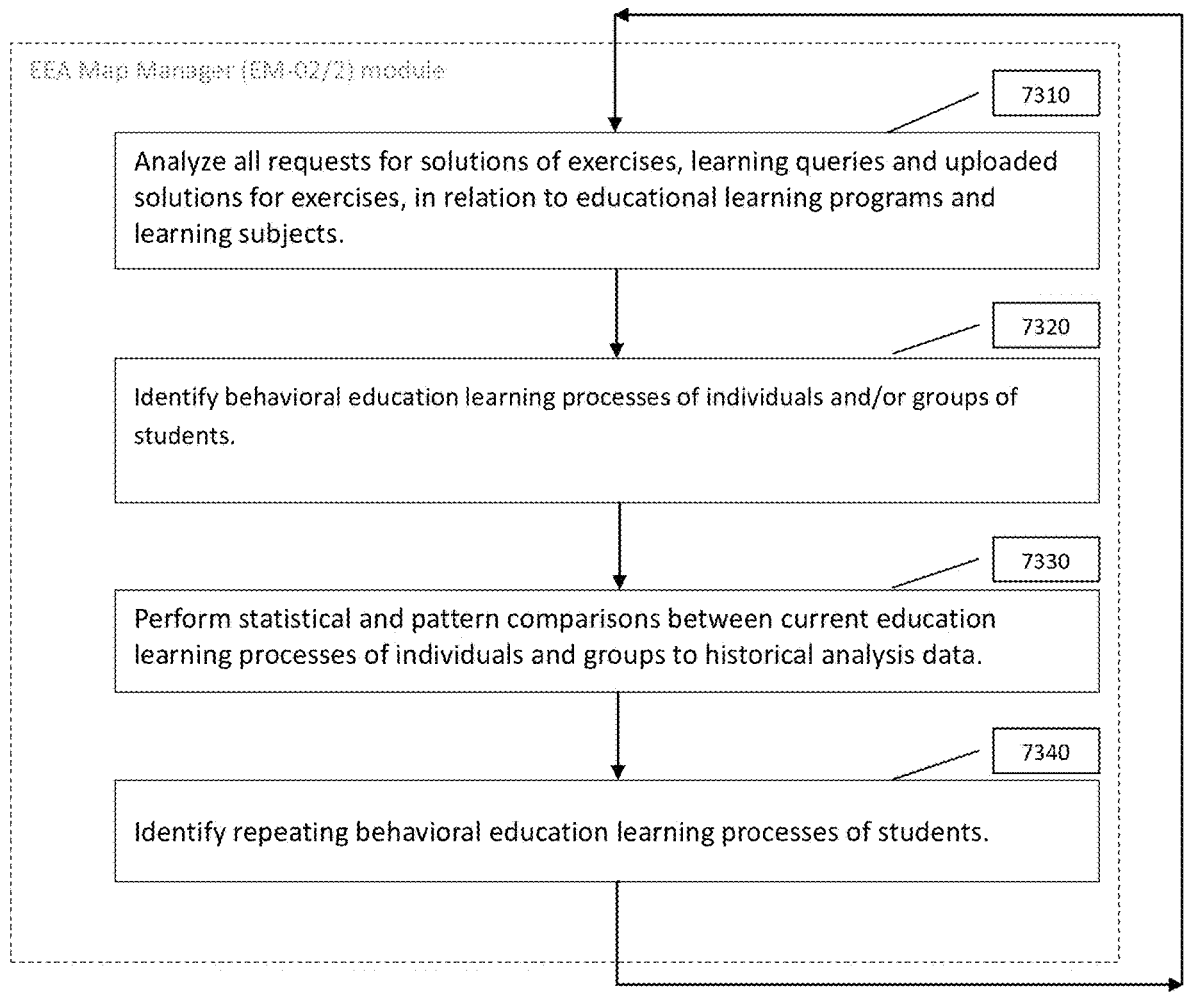
Figure 7.3 – Learning Patterns Identification processes, flow diagram

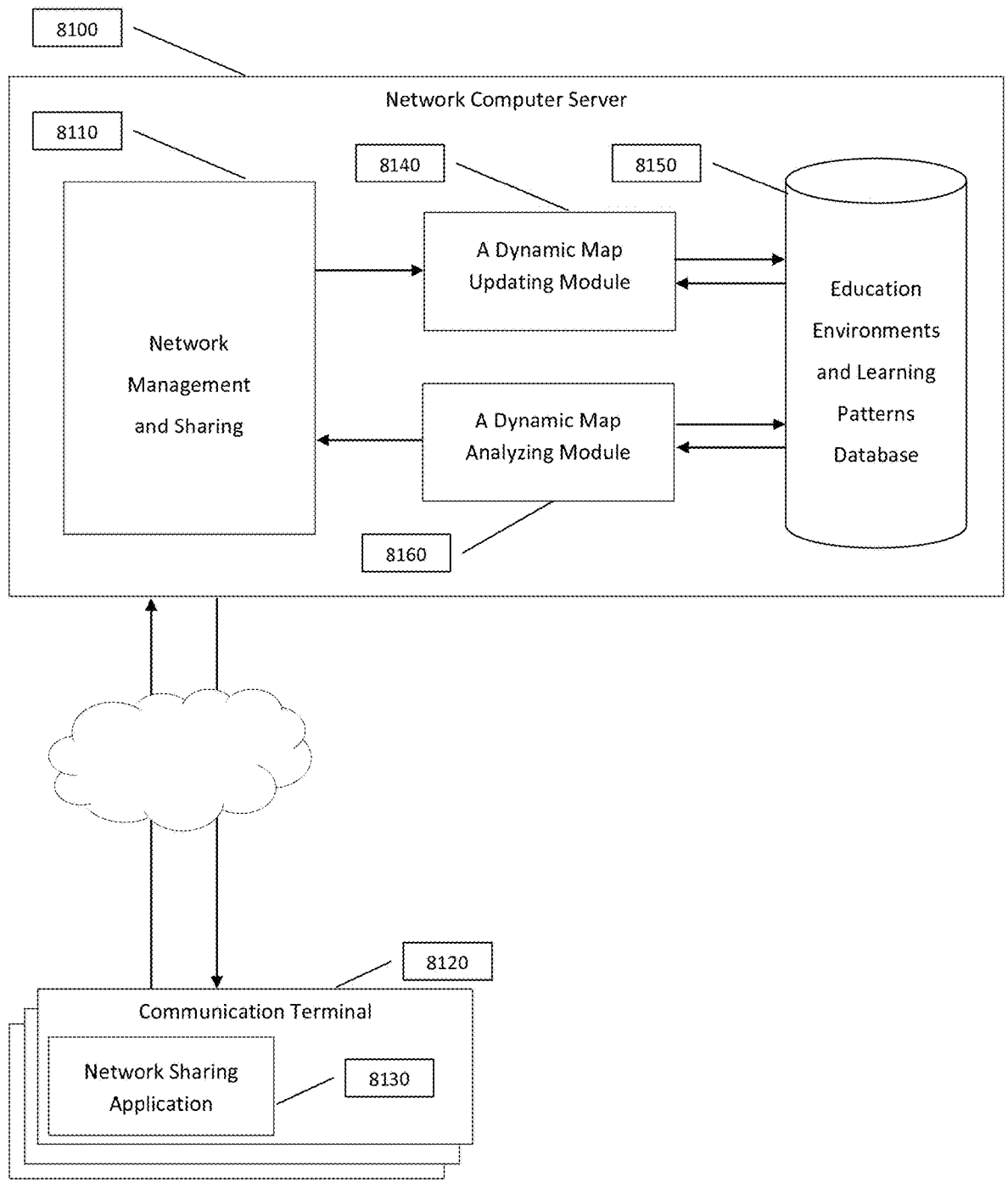
Figure 8.1 – Overview of a computerized system for analyzing behavioral education learning processes of students

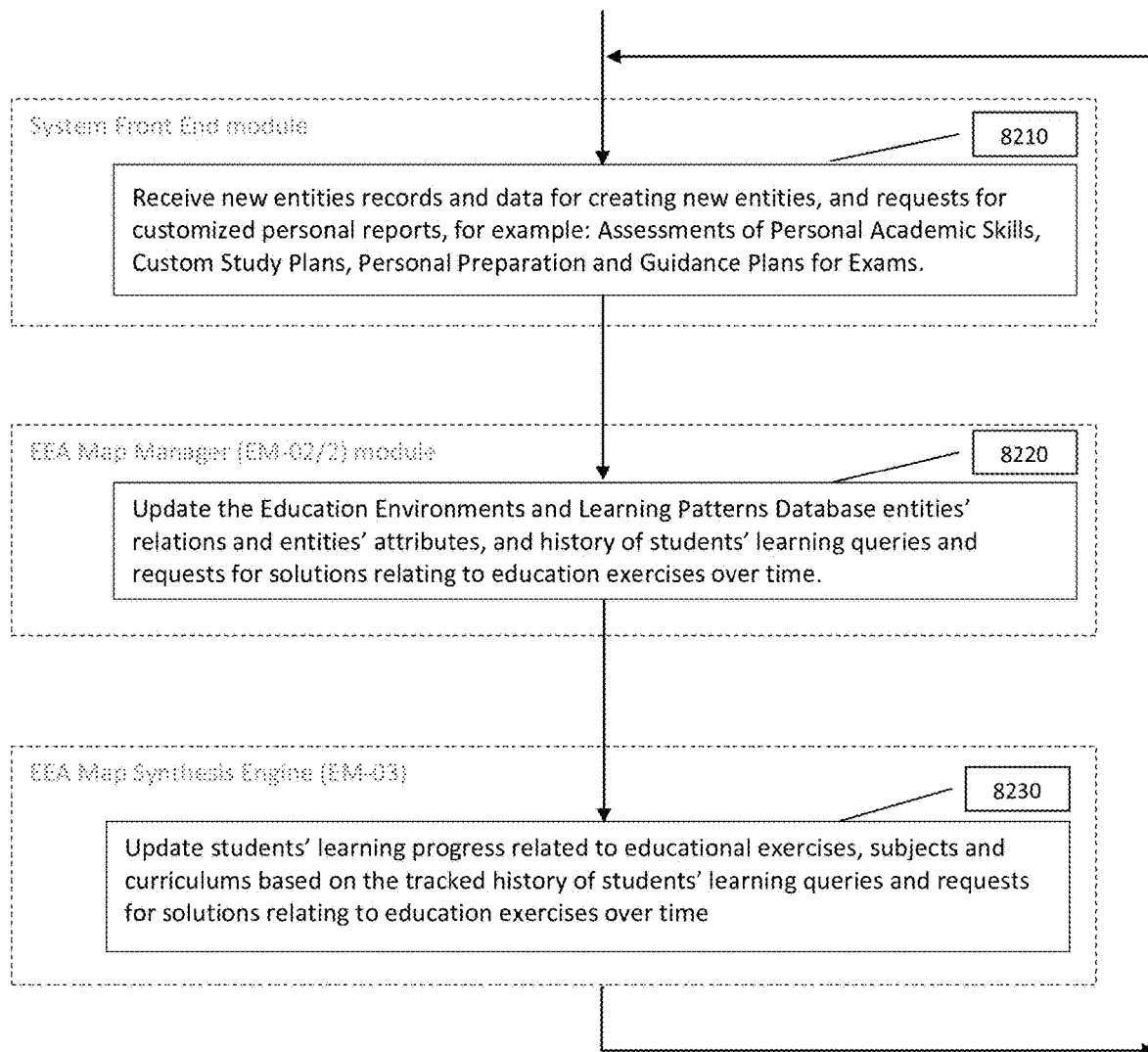
Figure 8.2 – Dynamic Map Updating Module processes, flow diagram

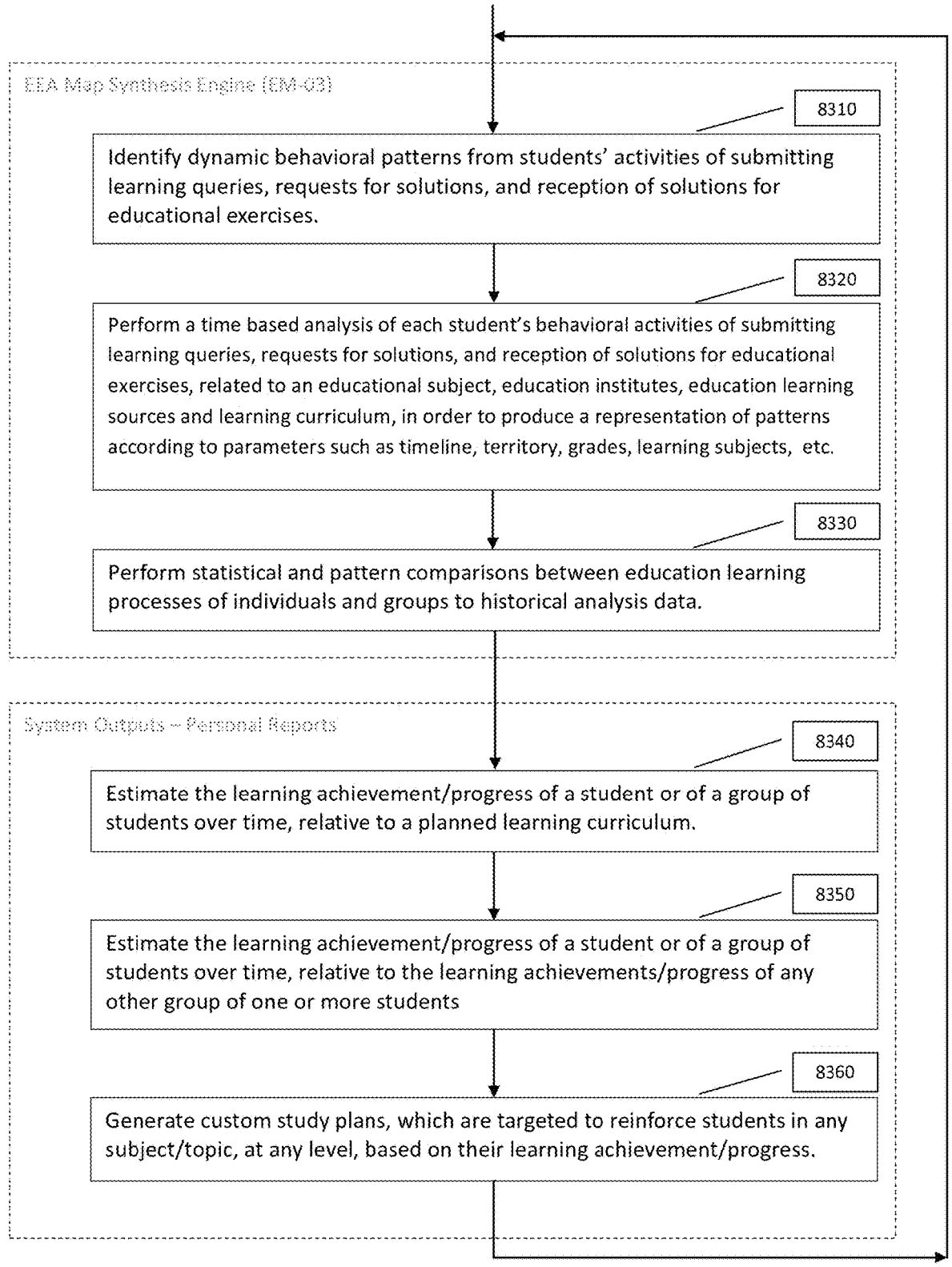
Figure 8.3 – Dynamic Map Analyzing Module processes, flow diagram

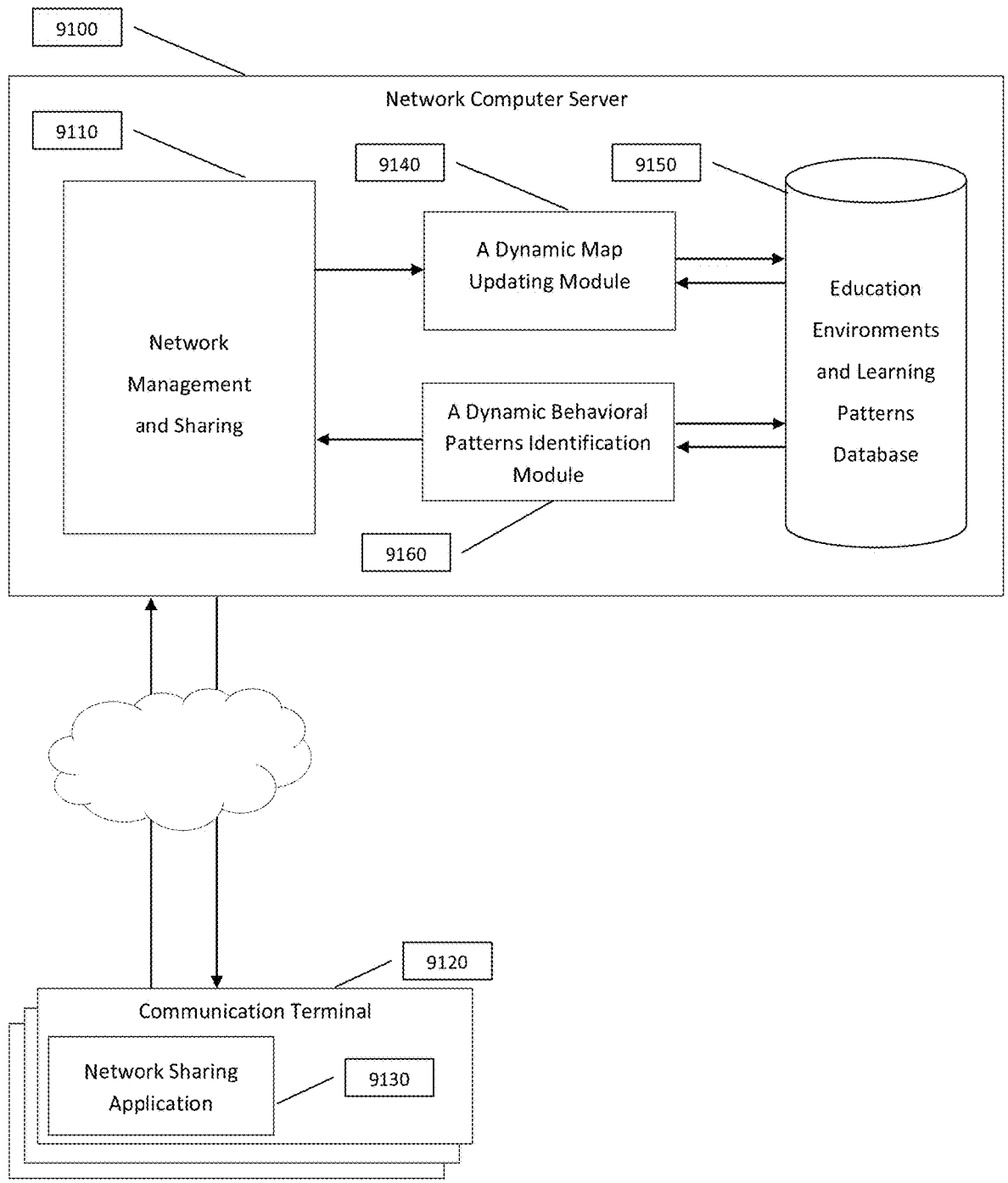
Figure 9.1 – Overview of a computerized system for identifying dynamic behavioral patterns from students' activities

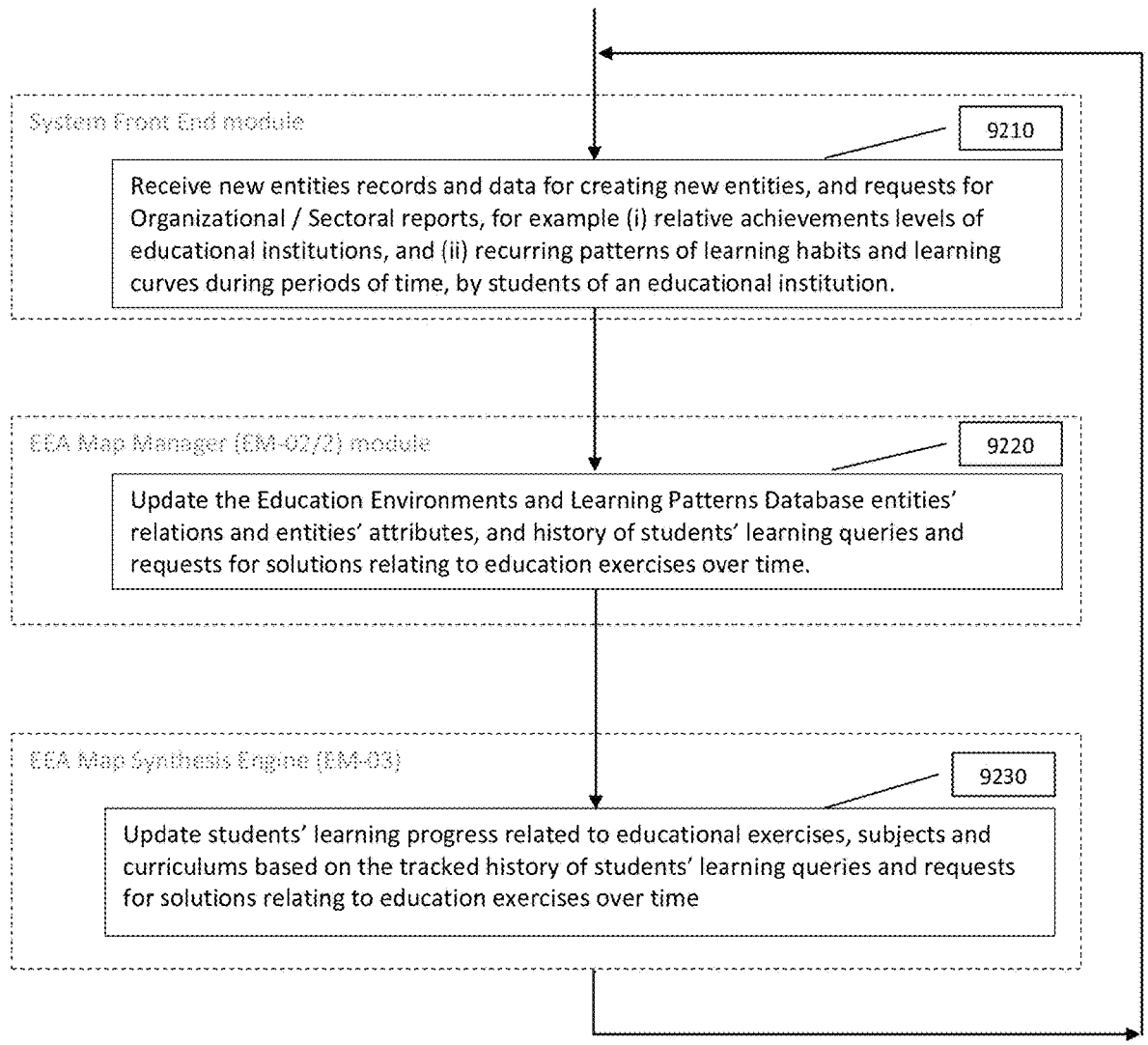
Figure 9.2 – Dynamic Map Updating Module processes, flow diagram

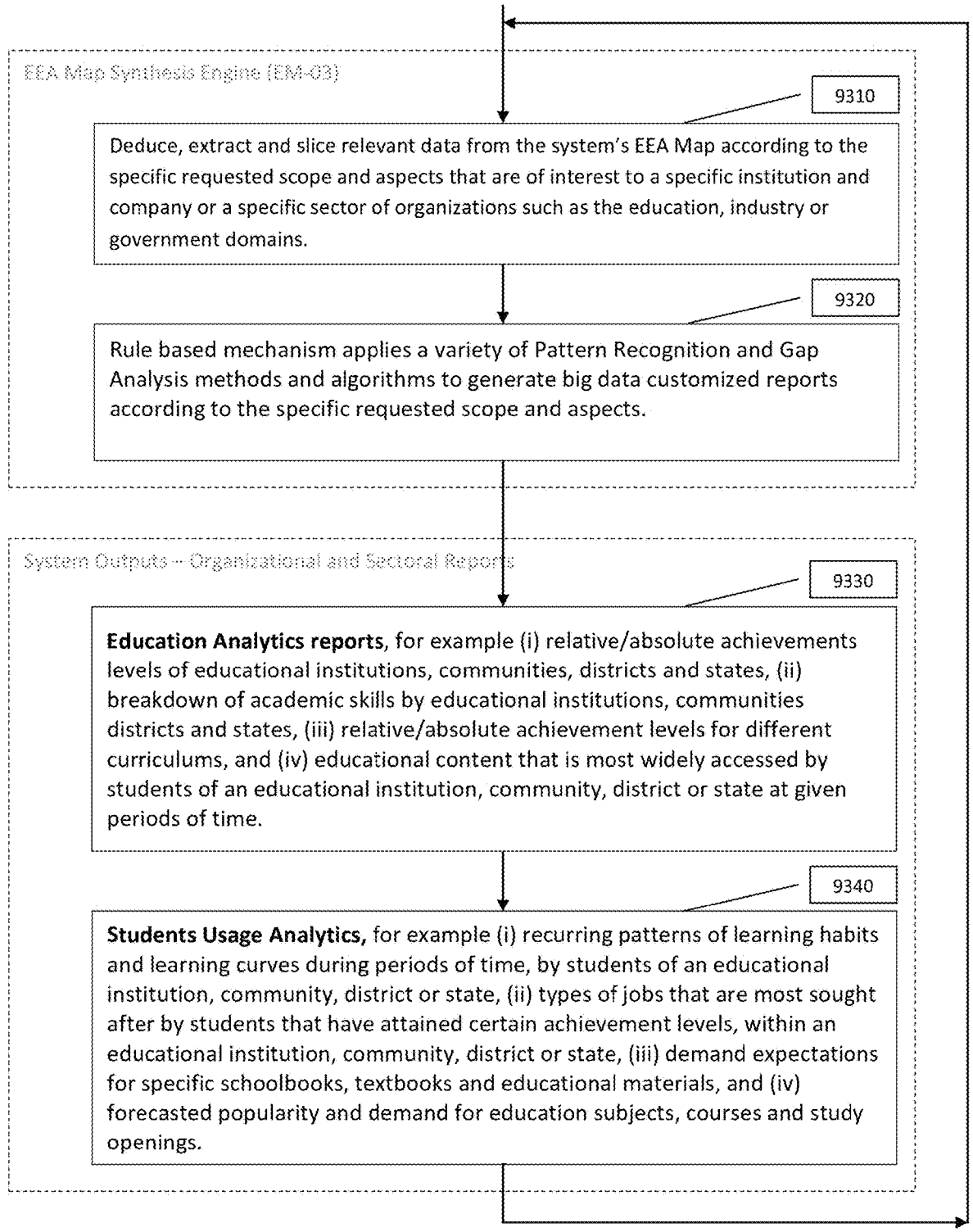
Figure 9.3 – Dynamic Behavioral Patterns Identification Module processes, flow diagram

SYSTEM AND METHOD FOR GATHERING, IDENTIFYING AND ANALYZING LEARNING PATTERNS

BACKGROUND

All students encounter difficulties with their studies from time to time. The assistance they require may differ in degree, ranging from help with simple homework assignments, study guides for a specific topic, preparation plans for exams, academic skill assessments, and more.

A pre-requisite to providing any form of meaningful assistance is acquiring knowledge and an in-depth comprehension of a student's current achievements, competencies, preferences and requirements. Once acquired, this knowledge may be used to provide students-related information, products and services, such as personalized guidance and study aids that are customized to the specific goals and needs of each student.

Several methods are currently employed for acquiring knowledge of a student's achievements, competencies, preferences and requirements, and then using this knowledge, for example when providing personalized study aids.

A private tutor provides one-to-one or small group sessions to students. During these sessions the tutor becomes acquainted with a student's learning abilities, development within a course, preferences and academic objectives. The tutor may then use her own skills and experience to produce personalized study aids, based on her assessment of each student's proficiencies and goals.

A Student fills out a personal survey and completes a proficiency test. A tutor then analyses the results and devises personalized study aids that are tailored exactly to that student's needs and relevant academic objectives.

Students access a courseware oriented online learning environment/service to receive homework chores, quizzes, sample tests and other assignments for a select course. Each student's performance and activities are continuously monitored to assess personal proficiencies, particular strengths and weaknesses. These evaluations are then used to generate personalized content, such as a custom study plan that links to practice educational and tutorial exercises that are targeted to reinforce a student in a specific topic.

Each of the methods described above for acquiring knowledge of a student's achievements, competencies, preferences and academic objectives, and then using this knowledge for providing personalized services such as study aids, has its drawbacks.

Personalized study aids that are provided by a private tutor based on the results of that tutor's assessment of a student's achievements, competencies and preferences during learning sessions, are completely dependent on that tutor's personal evaluation qualifications, and that tutor's ability to produce quality study aids. Another drawback of this method is that it is only relevant for those students who can afford private tutors to supplement the teaching they receive in school (less than 33% in urban US, 2012-13).

Personalized study aids that are provided by a tutor after analyzing the results of a personal survey and a proficiency test taken by a student, suffer from similar dependencies on that tutor's evaluation qualifications. Additional drawbacks of this method are (i) its sensitivity to a student's performance while undertaking the proficiency test/set of tests, which may not correctly reflect her real abilities, and (ii) it may generate frustration and resistance from students, who are required to participate in these evaluation processes in addition to their already burdening homework chores and efforts at school.

Personalized study aids that are generated by a courseware oriented online learning environment/service are limited in scope—they can only be provided for those topics that are included in that specific courseware, and they can only be provided to those students who pay/use/have access to that specific environment/service.

The present invention overcomes major drawbacks of the methods currently employed for these purposes.

Gathering of information is computerized and performed automatically during students' routine educational assignments from any educational source, therefore it (i) is not limited to any specific audience or topic, as in the case of the courseware oriented online learning environments/services, (ii) does not generate frustration or resistance from students, since it is performed without any additional effort on their part, as they do their homework and/or other educational assignments, and (iii) will produce more accurate students-related information since it is not dependent on the qualifications of a specific tutor for gathering and analyzing information, or on the performance of a student during a specific survey/proficiency test.

Evaluation and assessment of students' achievements, competencies and preferences are based on computerized algorithms and methods in the fields of Graph Theory, Pattern Recognition and Pattern Matching; hence they are not dependent on the availability or evaluation/assessment skills of a specific tutor.

Generating personalized study aids are performed by a computerized method and system using Graph Traversal and Rule Based Inference Engine algorithms and methods, hence they are not dependent on the availability or evaluation/assessment skills of specific tutors and can be offered to large students' communities at a standard and uniform quality.

Identification of insights, trends and behavioral patterns within students' groups are currently provided by research firms who specialize in developing and deploying questionnaires, executing surveys and applying statistical analysis algorithms and data mining methods on the gathered data.

According to the present invention, insights, trends and behavioral patterns within students' groups are automatically identified and deduced by the system from actual activities of users, therefore the system can produce information that (i) may not be otherwise available since it is either was not gathered by any other means, or (ii) was inaccurately gathered or analyzed by other means, or (iii) it is not cost effective to gather and analyze by conventional means such as polls and questionnaires, which in addition, may generate frustration to a degree that will affect the objectiveness of the results.

There is an obvious need for a computerized method and system which automatically gathers, acquires and collects students' usage data as they perform their routine learning assignments from any educational source (e.g. printed textbooks, e-textbook etc.), for the purpose of assessing their achievements, competencies, areas of interest, preferences and requirements, and then providing automatically generated students-related information and services that are based on this knowledge.

TECHNICAL FIELD

The present invention relates to the field of computerized systems which are based on utilization of information that is gathered by crowdsourcing and then processed and enhanced by artificial intelligence algorithms.

SUMMARY

The present invention is a computerized network server system that aggregates queries and solutions to education exercises which are submitted by students, and then identifies learning processes based on a digital index (referral) database of exercises that are required for educational learning processes. This database is created and updated on the basis of users' ongoing requests for exercises, uploaded solutions and related queries, and it manages associations and references between exercises, text books, learning programs, learning subjects and the locations of these entities within text books. The system enables uploading and sharing of solutions to education exercises, requests for solutions to exercises, submitting queries and viewing solutions to these exercises.

The present invention also analyses the behavioral education learning processes of students based on dedicated connected graphs data structures organized in a data base that represents relations between entities of students, education learning sources, education subjects and solutions of educational exercises, and may also represent relations with entities of education institutes, learning curriculums, educational exercise per subject, students' learning queries and students' requests for learning solutions. Students' learning queries and requests for solutions relating to education exercises are tracked over time, in order to automatically update their learning progress in relation to educational exercises, subjects and curriculums. Analysis results provide estimates of the learning achievement/progress of a student or of a group of students over time, relative to a planned learning curriculum or relative to other groups of students, and also enable generating personalized/custom study plans which are targeted to reinforce students in specific subjects/topics, at any given level.

The present invention also identifies dynamic behavioral patterns from students' activities of submitting learning queries, requests for solutions, and viewing solutions to educational exercises, and on the basis of these patterns automatically produces authentic, reliable real time analysis of actual learning and other types of activities and interests of groups of students.

BRIEF DESCRIPTION OF THE DRAWINGS

The present invention will be more readily understood from the detailed description of embodiments thereof made in conjunction with the accompanying drawings of which:

FIG. 1 is a block diagram depicting an Overview of the System, according to some embodiments of the invention.

FIG. 2 is a block diagram depicting the User Interfaces of the System, according to some embodiments of the invention.

FIG. 2.1 is a block diagram depicting dedicated applications for Uploading, Entering, Updating, Editing and Viewing Educational Information from a Computer, according to some embodiments of the invention.

FIG. 2.2 is a block diagram depicting dedicated applications for Uploading, Entering, Updating, Editing and Viewing Students Information from a Computer, according to some embodiments of the invention.

FIG. 2.3 is a block diagram depicting dedicated applications for Uploading, Entering, Updating and Editing Educational Information from a Mobile Device, according to some embodiments of the invention.

FIG. 2.4 is a block diagram depicting dedicated applications for Uploading, Entering, Updating and Editing Students Information from a Mobile Device, according to some embodiments of the invention.

FIG. 3 is a block diagram depicting the Front End of the System, according to some embodiments of the invention.

FIG. 4.0 illustrates a flow diagram of the internal logic and processes of the Education Environments and Activities Map Manager—EEA Map Manager (EM-02/2) module, according to some embodiments of the invention.

FIG. 4.1 illustrates an example of a Partial EEA Map depicting the data and knowledge regarding the structure of specified Educational Organizations and Education Subjects, according to some embodiments of the invention.

FIG. 4.2 illustrates an example of a Partial EEA Map depicting the data and knowledge regarding the structure of specified Learning Processes as Planned by a specified Organization (Education Subjects and Curriculums, Academic Requirements etc), according to some embodiments of the invention.

FIG. 4.3 illustrates an example of a Partial EEA Map depicting the data and knowledge regarding the structure of a specified Learning Subject and Educational Learning Sources (Text Books, Educational Exercises, Paper Written Learning Solutions, Pictorial Learning Solutions, Textual Learning Solutions), according to some embodiments of the invention.

FIG. 4.4 illustrates an example of a Partial EEA Map depicting the data and knowledge regarding the structure of Actual Learning Processes as Performed by a specified student (Student Navigation), according to some embodiments of the invention.

FIG. 4.5—illustrates a flow diagram for enhancing an Educational Source in an EEA Map, according to some embodiments of the invention.

FIG. 5.0 illustrates a flow diagram of the internal logic and processes of the EEA Map Synthesis Engine (EM-03) module, according to some embodiments of the invention.

FIG. 5.1 illustrates an example of a simple graph pattern that depicts rule based recognition of missing relation that results in a "create relation" action, according to some embodiments of the invention.

FIG. 5.2—illustrates a flow diagram for identifying and adding an unmarked educational exercise to an existing cluster, according to some embodiments of the invention.

FIG. 5.3—illustrates a flow diagram for processing incoming Educational Source data in an EEA Map, according to some embodiments of the invention.

FIG. 6 is a block diagram depicting the System Outputs Control, according to some embodiments of the invention.

FIG. 7.1—illustrates an overview of a computerized system for aggregating queries and solutions and identifying behavioral education learning process of students, according to some embodiments of the invention.

FIG. 7.2—illustrates a flow diagram of Network Management and Sharing processes, according to some embodiments of the invention.

FIG. 7.3—illustrates a flow diagram of Learning Patterns Identification processes, according to some embodiments of the invention.

FIG. 8.1—illustrates an overview of a computerized system for analyzing behavioral education learning processes of students, according to some embodiments of the invention.

FIG. 8.2—illustrates a flow diagram of Dynamic Map Updating Module processes, according to some embodiments of the invention.

FIG. 8.3—illustrates a flow diagram of Dynamic Map Analyzing Module processes, according to some embodiments of the invention.

FIG. 9.1—illustrates an overview of a computerized system for identifying dynamic behavioral patterns of students, according to some embodiments of the invention.

FIG. 9.2—illustrates a flow diagram of Dynamic Map Updating Module processes, according to some embodiments of the invention.

FIG. 9.3—illustrates a flow diagram of Dynamic Behavioral Patterns Identification Module processes, according to some embodiments of the invention.

DETAILED DESCRIPTION

Before explaining at least one embodiment of the invention in details, it is to be understood that the invention is not limited in its application to the details of construction and the arrangement of the components set forth in the following description or illustrated in the drawings. The invention is applicable to other embodiments and/or may be practiced or carried out in various ways. Also, it is to be understood that the phraseology and terminology employed herein is for the purpose of description and should not be regarded as limiting.

The present invention describes a community based computerized method and system which automatically gathers, acquires and collects students' usage data as they perform their routine learning assignments from any educational source (e.g. printed textbooks, e-textbook etc.), for the purpose of assessing their achievements, competencies, areas of interest, preferences and requirements, in order to be able to provide students-related information and services that are based on this knowledge, for example (i) automatically generated personalized study aids such as custom study guides, preparation plans for exams and academic skills assessment reports, and (ii) insights, trends and behavioral patterns within students' groups, that are identified and deduced by the system from actual activities of users, such as learning habits, areas of interest, and demand for new and existing educational learning sources.

Reference is now made to FIG. 1 illustrating an overview of the system. According to this embodiment, the system receives Educational Information 101 such as Educational Learning Sources (I-01), Education Subjects and Curriculums (I-02), Educational Institutions Data (I-03) and Academic Requirements (I-04); and the system also receives Learning Solutions 102 such as Paper Written Learning Solutions (I-05) and Textual Learning Solutions (I-07); and the system also receives Students Information 103 such as Personal Data (I-08), Learning Content Requests (I-09), Students Learning Queries/Comments (I-10) and Learning Content Rankings (I-11). All of these inputs are uploaded to the system via the System Users Interfaces 104. The system also receives Web Learning Content (I-12) 105 via a set of web Crawlers/Bots 106. Each of the various types of inputs is accompanied by Session Parameters (I-13) 100 that contain its specific usage information data. All of the inputs are received by the System Front End 107 which performs preliminary processing, sorting, and storage. Session Parameters (I-13) 100 are stored in the Users Sessions Events Logger 108; the data, resources and materials, which are continuously received as inputs from users of the system as well as gathered and collected by the various input modules of the system, are maintained by the Resources Repository Data Base 109. All of the data that is received from the System Front End 107 is used by the EEA Map Builder 110 for building the initial EEA Map 111, and continuously updating it with each new input. An initial map may also be created on the basis of other data from external sources that may be received by the system. The EEA Map Manager 112 contains self-maintenance modules of the system that constantly sample, re-calculate and dynamically update properties of the EEA Map 111 objects. The EEA Map Synthesis Engine 113 is the sophisticated analytical component of the EEA Map 111, and is responsible for producing contents for the various types of user requested Output Reports 114 based on the updated EEA map objects and their properties, for example—Grading of Personal Achievement Levels (O-01), Assessment of Personal Academic Skills (O-02), Personal Recommendations of Academic Opportunities (O-03), Personal Recommendations for Professions (O-04), Personal Recommendations for Jobs (O-05), Custom Study Plans (O-06), Personal Preparations and Guidance Plans for Exams (O-07), Education Analytics (O-08), and Students Usage Analytics (O-09).

System Inputs

The system receives and collects a broad range of education and learning related inputs from a variety of sources. Irrespective of the sources or contents of these inputs, the system also collects and gathers session parameters that are associated with each of the operations and activities carried out by users while interacting with the system, as described below.

Educational Learning Sources (I-01) are learning materials from which students study, for example printed textbooks, e-textbooks, official/non-official/recommended practice tests, past years' exams, quizzes, etc. Each educational source has several attributes such as its name, its identifier, its learning subject category, learning sub-categories, number of pages it contains, number of educational exercises it contains, an image of its external cover page, its related class/grade/level/learning programs, and more. This information may be attained from publicly accessible official data sources such as a list of Approved Textbooks that is provided by a department of education, curriculum guides and textbooks that are selected by a board of education or an individual educational institution district, etc., as well as information that is provided and entered by various users of the system. Each Educational Source is kept in the system with a time stamp of its entry and all of its attributes.

Education Subjects and Curriculums (I-02) are learning programs that are prepared and publicly published by states (national level), boards of education, educational institutions districts and associations, for various types of educational institutions. Learning programs are comprised of (i) compulsory and optional education subjects in varying levels of detail, and (ii) learning schedules, lists of Educational Learning Sources/courses/assignments etc., that students need to complete in order to graduate a specific course/class/plan etc. Education Subjects and Curriculums are kept in the system with a time stamp of their entry and with parameters that identify their associated educational institutions and courses.

Educational Institutions Data (I-03) is information that (i) identifies educational institutions, for example by name, type, grades, age ranges, location etc., and (ii) lists learning attributes, for example which Educational Learning Sources are taught from in that educational institution, which Education Subjects and Curriculums are used by that educational institution, etc. This information may be attained from publicly accessible official data sources such as a list of Approved Educational Institutions that is provided by a department of education, curriculum guides and textbooks that are selected by an individual educational institution district to reflect a state's learning standards, as well as information that is provided and entered by various users of the system. Data for each educational institution is kept in the system with a time stamp of its entry, and with its associated learning attributes.

Academic Requirements (I-04) are educational pre-requisites such as academic credits, academic units, compulsory courses, minimal grades etc., that students need to achieve in order to meet certain educational goals, for example maintaining a current study plan level, eligibility for enrollment to a higher course, qualifying for an academic degree, admission to an educational institution, etc. This information may be attained from official data sources such as public educational institutions' enrollment and graduation requirements that are published by departments of education (state level), from publicly accessible academic requirements data sources that are provided by private educational institutions, state run/private colleges etc., as well as information that is provided and entered by various users of the system. Academic Requirements are kept in the system with a time stamp of their entry, and with additional parameters that enable relating them to relevant study plans, courses, academic degrees etc.

Paper Written Learning Solutions (I-05) are written or printed sheets of paper that contain various types of learning content, such as learning solutions and/or explanations to educational exercises from textbooks, homework, or any other educational assignments, in any learning subject. Paper Written Learning Solutions (I-05) are converted to pictorial format files, which are then uploaded to the system for further processing.

Pictorial Learning Solutions (I-06) may be (i) any digital pictorial and/or video and/or audio format that contains learning solutions and/or explanations to educational exercises from textbooks, homework, or any other educational assignments, in any learning subject, and/or (ii) Paper Written Learning Solutions (I-05) that have been converted to common digital pictorial format files such as jpeg, png, tiff, PDF, PCX, Flash, AVI, WAV, Mpeg, YouTube files etc., with the aid of common imaging devices and/or video/audio devices and editors, for example a camera, a smartphone camera, domestic scanner, home fax, editing software etc. Each Pictorial Learning Solution is coupled with a set of parameters that identify the specific item within an Educational Source (I-01) to which the learning content it contains relates, for example the learning subject, a textbook's name, page number, educational exercise and sub-exercise number etc. Pictorial Learning Solutions, either as digital files or as URLs (references to existing web pages where they can be viewed), and their associated parameters are uploaded and kept in the system with a time stamp, and with the identifier of the uploading user, and may then be displayed to other students who need help during their routine educational chores.

Textual Learning Solutions (I-07) are digital files in common formats such MS-Word, OpenDocument, PDF etc., that contain various types of learning content, such as learning solutions and/or explanations to educational exercises from textbooks, homework, or any other educational assignments, in any learning subject. Each Textual Learning Solution is coupled with a set of parameters that identify the specific item within an Educational Source (I-01) to which the learning content relates, for example the learning subject, a textbook's name, page number, educational exercise and sub-exercise number etc. Textual Learning Solutions, either as digital files or as URLs (references to existing web pages where they can be viewed), and their associated parameters are uploaded and kept in the system with a time stamp, and with the identifier of the uploading user, and may then be displayed to other students who need help during their routine educational chores.

Personal Data (I-08) contains information that relates to a specific user of the system for example name, age, gender, educational institution, home area etc., which is entered by that user. Personal Data is kept in the system with a time stamp of entry, and with geographic location data.

Learning Content Requests (I-09) are users' requests to view specific learning content items, such as learning solutions and/or explanations to educational exercises from textbooks, homework, or any other educational assignments, in any learning subject. Users provide information that identifies the desired learning content items, for example their related learning subject, textbooks' names, page numbers, educational exercise numbers etc. Each Learning Content Request is kept in the system with a time stamp, the requesting user's identifier, and a set of parameters that identify the specific learning content item within an Educational Source (I-01) to which the Learning Content Request relates to, and is then handled by the system.

Students Learning Queries/Comments (I-10) are queries, comments and opinions that a user may add to discussion forums that are associated to each of the learning content items, such as learning solutions and/or explanations to educational exercises from textbooks, homework, or any other educational assignments, in any learning subject. Each comment is kept in the system with a time stamp, the identifier of the commenting user, a set of parameters that identify the specific learning content item within an Educational Source (I-01) to which the learning content that the comment and/or opinion is associated to relates (e.g. the learning subject, a textbook's name, page number, educational exercise and sub-exercise number etc.), and can then be viewed by other users of the system.

Learning Content Rankings (I-11) are quantitative scores (e.g. a score of 3 out of a maximum score of 5) as well as informative opinions (e.g. "The end result is right but I did not understand the calculations"), that a user may add to each learning content item, such as a learning solution and/or explanation to an educational exercise from a textbook, homework, or any other educational assignment, in any learning subject. Each ranking is kept in the system with a time stamp, the identifier of the ranking user, and a set of parameters that identify the specific learning content item within an Educational Source (I-01) to which the learning content that the Learning Content Ranking is associated to relates (e.g. the learning subject, a textbook's name, page number, educational exercise and sub-exercise number etc.), and can then be viewed by other users of the system.

Web Learning Content (I-12) is any education related content that can be freely accessed and gathered from web sites, students' forums, publishers and educational forums, education news and bulletins etc., for example—requests for learning solutions, lists of approved text books, lists of qualified educational institutions, newly published academic requirements, recommendations for an educational source, etc. This information is gathered by web crawlers/bots that constantly trawl the web for relevant sites and new education related content.

Session Parameters (I-13) are usage information data items that are associated with each of the operations and activities carried out by users while interacting with the system, which the system collects, gathers and logs, for example the type of operation performed by a user, it's time stamp, the user's identification, browser type, operating system, type of computer, geographical region, time from start of session, time from entering a page or state, time since last visit, duration on each page, navigation history etc.

System Users Interfaces

Reference is now made to FIGS. 2, 2.1, 2.2, 2.3 and 2.4 illustrating the System Users Interfaces as described below.

FIG. 2 is a block diagram depicting the User Interfaces of the System, according to some embodiments of the invention. According to this embodiment, interfaces are provided for uploading inputs such as (i) Paper Written Learning Solutions (I-05) 210, via any standard/home fax machine, Computer or Mobile Device, as detailed in the descriptions of UI-01, UI-02 and UI-03 below, and (ii) Textual Learning Solutions (I-07) 254, via a Computer or Mobile Device as detailed the description of UI-04 below, and (iii) Educational Information (I-01, I-02, I-03 and I-04) 264, via a Computer or Mobile Device as detailed in the description of in UI-05 below, and (iv) Students Information (I-08, I-09, I-10 and I-11) 274, via a Computer or Mobile Device as detailed in the description of UI-06 below.

UI-01 Pictorial Learning Solutions by Facsimile depicts Paper Written Learning Solutions (I-05) that are converted by any standard/home fax machine 221 to Pictorial Learning Solutions (I-06) 222 and then uploaded to the system via standard telephony 223. Users may add (handwritten or text editing) information to Paper Written Learning Solutions (I-05) before they are converted to Pictorial Learning Solutions (I-06), for example (i) parameters that identify the specific items within Educational Learning Sources (I-01) to which the learning content of the Paper Written Learning Solutions relates, such as education subjects, textbooks' names, page numbers, educational exercise and sub-exercise numbers etc, and (ii) their own uploader identifier.

UI-02 Pictorial Learning Solutions by Computer and/or Mobile Device depicts (i) Paper Written Learning Solutions (I-05) that are converted by any domestic imaging device such as a camera 231, scanner 232, cellphone camera etc., to Pictorial Learning Solutions (I-06) 233 which are then transferred to a repository from where they may be uploaded to the system, and (ii) any pre-prepared digital pictorial and/or video and/or audio format that contains learning solutions and/or explanations to educational exercises from textbooks, homework, or any other educational assignments, in any learning subject. Pictorial Learning Solutions (I-06) from any source may be uploaded to the system in several ways, for example:

Pictorial Learning Solutions (I-06) 233 may be uploaded to the system via a dedicated computer application 234 that runs on the users' computers or browsers, as depicted in FIG. 2.2, or from a mobile device via a dedicated application for mobile devices 234 as depicted in FIG. 2.4. Users use the menus 2210, 2220, 2410, 2420 and data entry fields 2230, 2430 that are provided by these applications to enter/select parameters that identify the specific items within Educational Learning Sources (I-01) to which the learning content that is contained in the Pictorial Learning Solutions (I-06) relates, for example education subjects, textbooks' names, page numbers, educational exercise and sub-exercise numbers etc.

Pictorial Learning Solutions (I-06) 233 may also be uploaded from computers/mobile devices to the system via $3^{rd}$ party uploading and storage applications/services 235 such as Picasa, Dropbox, Google Docs, Instagram, RapidShare etc. Before uploading the Pictorial Learning Solutions (I-06) to the system, users may also use the menus and data entry fields that are provided by these applications/services to enter/select parameters that identify the specific items within Educational Learning Sources (I-01) to which the learning content that is contained in the Pictorial Learning Solution (I-06) relates, for example education subjects, textbooks' names, page numbers, educational exercise and sub-exercise numbers etc.

Pictorial Learning Solutions (I-06) may also be uploaded from computers/mobile devices to the system as email attachments. Users compose these email messages using any standard email software/services 236 such as Gmail, Outlook etc., and may also enter (by typing in the body of the email message, by editing the Pictorial Learning Solution files or by any other means) parameters that identify the specific items within Educational Learning Sources (I-01) to which the learning content that is contained in the Pictorial Learning Solution (I-06) relates, for example education subjects, textbooks' names, page numbers, educational exercise and sub-exercise numbers etc.

UI-03—intentionally left blank

UI-04 Textual Learning Solutions by Computer and/or Mobile Device depicts Textual Learning Solutions (I-07) 254 that are entered from and/or prepared and uploaded from computers and/or mobile devices in several ways, for example:

Textual Learning Solutions (I-07) 254 may be entered directly to the system 251 from a computer via a dedicated computer application 252 that runs on the users' computers or browsers as depicted in FIG. 2.2, or from a mobile device via a dedicated application for mobile devices 252 as depicted in FIG. 2.4. Users use the menus 2210, 2220, 2410, 2420 and data entry fields 2230, 2430 that are provided by these applications to (i) enter the Textual Learning Solutions with editors that are provided by the applications, and (ii) enter/select parameters that identify the specific items within Educational Learning Sources (I-01) to which the learning content that is contained in the Textual Learning Solutions (I-07) relates, for example education subjects, textbooks' names, page numbers, educational exercise and sub-exercise numbers etc.

Textual Learning Solutions (I-07) 254 may also be prepared on a computer/mobile device with any standard word processor/scientific editor 253, for example MS-Word, OpenDocument, LaTeX, Scientific Word, Excel, Visio etc., and then uploaded to the system via a dedicated computer application 252 that runs on the users' computers or browsers as depicted in FIG. 2.2, or via a dedicated application for mobile devices 252 as depicted in FIG. 2.4. Before uploading Textual Learning Solutions (I-07) 254 to the system, users may also use the menus 2210, 2220, 2410, 2420 and data entry fields 2230, 2430 that are provided by the dedicated applications to enter/select parameters that identify the specific items within Educational Learning Sources (I-01) to which the learning content that is contained in the Textual Learning Solutions (I-07) 254 relates, for example education subjects, textbooks' names, page numbers, educational exercise and sub-exercise numbers etc.

Textual Learning Solutions (I-07) 254 may also be uploaded to the system from computers/mobile devices via $3^{rd}$ party uploading and storage applications/services 255 such as Picasa, Dropbox, Google Docs, Instagram, Rapid- Share etc. Users prepare Textual Learning Solutions 254 with any standard word processor/scientific editor 253, for example MS-Word, OpenDocument, LaTeX, Scientific Word, Excel, Visio etc. Before uploading Textual Learning Solutions (I-07) 254 to the system, users may also use the menus and data entry fields that are provided by the $3^{rd}$ party uploading and storage applications/services to enter/select parameters that identify the specific items within Educational Learning Sources (I-01) to which the learning content that is contained in the Textual Learning Solutions (I-07) 254 relates, for example education subjects, textbooks' names, page numbers, educational exercise and sub-exercise numbers etc. Textual Learning Solutions (I-07) 254 may also be uploaded to the system as email attachments from computers/mobile devices. Users prepare Textual Learning Solutions (I-07) 254 with any standard word processor/scientific editor 253, for example MS-Word, OpenDocument, LaTeX, Scientific Word, Excel, Visio etc., and then compose email messages using any standard email software/services 256 such as Gmail, Outlook etc. Before transmitting the emails, they may also enter (e.g. by typing in the bodies of the email messages or by editing the Textual Learning Solutions) parameters that identify the specific items within Educational Learning Sources (I-01) to which the learning content that is contained in the Textual Learning Solution (I-07) 254 relates, for example education subjects, textbooks' names, page numbers, educational exercise and sub-exercise numbers etc.

Textual Learning Solutions (I-07) 254 may also be sent to the system as email messages from computers/mobile devices. Users compose email messages using any standard email software/services 256 such as Gmail, Outlook etc., and enter 257 (by typing or any other means) Textual Learning Solutions (I-07) 254 in the bodies of the messages. Before transmitting the emails, they may also enter parameters that identify the specific items within Educational Learning Sources (I-01) to which the learning content that is contained in the Textual Learning Solution (I-07) 254 relates, for example education subjects, textbooks' names, page numbers, educational exercise and sub-exercise numbers etc.

UI-05 Educational Information by Computer/Mobile Device depicts entry and uploading of Educational Information 264 such as Educational Learning Sources (I-01), Education Subjects and Curriculums (I-02), Educational Institutions Data (I-03) and Academic Requirements (I-04), from computers and/or mobile devices in several ways, for example:

Educational Information 264 may be entered directly to the system 261 from a computer via a dedicated computer application 262 that runs on the users' computers or browsers as depicted in FIG. 2.1, or from a mobile device via a dedicated application for mobile devices 262 as depicted in FIG. 2.3. Users use the menus 2110, 2120, 2310, 2320, editor and data entry fields 2130, 2330 that are provided by these dedicated applications to enter Educational Information 264, for example lists of approved textbooks/e-textbooks, recommended learning programs, lists of state educational institutions, educational institutions' enrollment and graduation requirements etc.

Educational Information 264 may also be uploaded to the system as files in various digital formats, via a dedicated computer application 262 that runs on the users' computers or browsers as depicted in FIG. 2.1, or via a dedicated application for mobile devices 262 as depicted in FIG. 2.3. Users prepare these files on a computer/mobile device with any standard word processor/editor or other application 263, for example MS-Word, Excel, OpenDocument etc. Before uploading the Educational Information 264 files to the system, users may also use the menus 2110, 2120, 2310, 2320 and data entry fields 2130, 2330 that are provided by the dedicated applications to add related content such as information sources, references to relevant case studies/programs, professional notes/memos, etc.

Educational Information 264 may also be uploaded as files in various digital formats to the system via $3^{rd}$ party uploading and storage applications/services 265 such as Picasa, Dropbox, Google Docs, Instagram, RapidShare etc. Users prepare files that contain Educational Information 264 on a computer/mobile device with any standard word processor/editor or other application 263, for example MS-Word, Excel, OpenDocument etc. Before uploading the Educational Information 264 files to the system, users may also use the menus and data entry fields that are provided by the $3^{rd}$ party uploading and storage applications/services to add related content such as information sources, references to relevant case studies/programs, professional notes/memos, etc.

Educational Information 264 may also be uploaded to the system as email attachments from computers/mobile devices. Users prepare files that contain Educational Information 264 with any standard word processor/editor or other application 263, for example MS-Word, Excel, OpenDocument etc., and then compose email messages using any standard email software/services 266 for example Gmail, Outlook etc. Before transmitting the emails, users may also enter (by typing in the bodies of the email messages, by editing the files that contain Educational Information 264, or by any other means) additional related content such as information sources, references to relevant case studies/programs, professional notes/memos, etc.

Educational Information 264 may also be sent to the system as email messages from computers/mobile devices. Users compose email messages using any standard email software/services 266 for example Gmail, Outlook etc., and enter 267 (by typing or any other means) Educational Information 264 in the body sections of these emails. Users may also include additional related content such as information sources, references to relevant case studies/programs, professional notes/memos, etc., in the body sections of these emails.

UI-06 Students Information by Computer/Mobile Device depicts entry and uploading of Students Information 274 such as Personal Data (I-08), Learning Content Requests (I-09), Students Learning Queries/Comments (I-10) and Learning Content Rankings (I-11), from computers and/or mobile devices in several ways, for example:

Students Information 274 may be entered directly to the system 271 from a computer via a dedicated computer application 272 that runs on the users' computers or browsers as depicted in FIG. 2.2, or from a mobile device via a dedicated application for mobile devices 272 as depicted in FIG. 2.4. Users use the menus 2210, 2220, 2410, 2420, editor and data entry fields 2230, 2430 that are provided by these dedicated applications to enter Students Information 274, for example name, age, gender, requests to view specific learning content items, comments and/or opinions that a user may add to discussion forums, quantitative scores and informative opinions that a user may add to each learning content item, etc.

Students Information 274 may also be uploaded to the system as files in various digital formats, via a dedicated computer application 272 that runs on the users' computers or browsers as depicted in FIG. 2.2, or via a dedicated application for mobile devices 272 as depicted in FIG. 2.4. Users prepare these files on a computer/mobile device with any standard word processor/editor or other application 273, for example MS-Word, Excel, OpenDocument etc. Before uploading the Students Information 274 files to the system, users may also use the menus 2210, 2220, 2410, 2420 and data entry fields 2230, 2430 that are provided by the dedicated applications to add related content such as personal requests, questions that may arise, new ideas, recommendations etc.

Students Information 274 may also be uploaded as files in various digital formats to the system via 3$^{rd}$ party uploading and storage applications/services 275 such as Picasa, Dropbox, Google Docs, Instagram, RapidShare etc. Users prepare files that contain Students Information 274 on a computer/mobile device with any standard word processor/editor or other application 273, for example MS-Word, Excel, OpenDocument etc. Before uploading the Students Information 274 files to the system, users may also use the menus and data entry fields that are provided by the 3$^{rd}$ party uploading and storage applications/services to add related content such as personal requests, questions that may arise, new ideas, recommendations etc.

Students Information 274 may also be uploaded to the system as email attachments from computers/mobile devices. Users prepare files that contain Students Information 274 with any standard word processor/editor or other application 273, for example MS-Word, Excel, OpenDocument etc., and then compose email messages using any standard email software/services 276 for example Gmail, Outlook etc., Before transmitting the emails, users may also enter (by typing in the bodies of the email messages or by editing the files that contain Students Information 274 or by any other means) additional related content such as personal requests, questions that may arise, new ideas, recommendations etc.

Students Information 274 may also be sent to the system as email messages from computers/mobile devices. Users compose email messages using any standard email software/services 276 for example Gmail, Outlook etc., and enter 277 (by typing or any other means) Students Information 274 in the body sections of these emails. Users may also include additional related content such as personal requests, questions that may arise, new ideas, recommendations etc., in the body sections of these emails.

Students Information 274 may also collected from the UI of a search engine that is provided by the system to its users, to enable searching for learning content. The system transforms search terms data that are entered by users 277 into Learning Content Requests and stores them for further analysis.

Reference is now made to FIGS. 7.1, 8.1 and 9.1 illustrating overviews of several processes that involve users' interactions with the system according to some embodiments of the invention. According to these embodiments, blocks 7120, 8120 and 9120 respectively, depict communication terminals such as a Facsimile, Computer or Mobile Device, and blocks 7130, 8130 and 9130 respectively, depict Network Sharing Applications such as Computer Applications, Mobile Device Applications, 3$^{rd}$ Party Storage Applications or Email, all of which enable users to upload inputs such as Paper Written Learning Solutions (I-05), Pictorial Learning Solutions (I-06), Textual Learning Solutions (I-07), Educational Information (I-01, I-02, I-03, I-04), and Students Information (I-08, I-09, I-10, I-11).

Crawlers

The Crawlers module activates a set of web crawlers/bots to constantly trawl the web for any education related content that can be freely accessed and gathered from web sites, students' forums, publishers and educational forums, education news and bulletins etc.

The Crawlers module is responsible for the ongoing configuring and activating of web crawlers/bots with parameters that optimize the process of gathering relevant education related content, for example (i) white and black lists of web site addresses (URLs), students' forums, publishers and educational forums, education news and bulletins etc., and (ii) timing parameters for controlling web-reaping intervals for varying types of content and web sites, and (iii) semantic rules/maps that will enable detection of information items that are relevant to the education space, such as requests for learning solutions, newly published academic requirements, recommendations for an educational source, etc.

Reference is now made to FIGS. 7.1, 8.1 and 9.1 illustrating overviews of several processes that involve users' interactions with the system according to some embodiments of the invention. According to these embodiments Crawlers are depicted by the Network Management and Sharing Application blocks 7110, 7130, 8110, 8130, 9110 and 9130. Note that Crawlers may be integrated both the Network Computer Server 7100, 8100 and 9100, and in the Communication Terminal 7120, 8120, 9120.

System Front End

The System Front End implements methods and protocols for receiving various types of inputs (refer System Inputs description and FIG. 1 System Overview) from the System Users Interfaces (refer System Users Interfaces description and FIG. 2) and from Crawlers (refer Crawlers description), storing the data in the system's Resources Repository Data Base and performs preliminary processing of these inputs so that they may be used by other components of the system, such as the Education Environments and Activities Map Builder.

The contents of each input are processed by System Front End modules, which are dedicated to (i) providing the appropriate entry point handlers, for example email hub, fax server, web service, crawlers etc., and (ii) handling and storing the input according to its specific type, in the Resources Repository Data Base for example Pictorial Learning Solution (I-06), Educational Institutions Data (I-03), Personal Data (I-08) etc., and (iii) forwarding input events parameters to Users Sessions Events Logger (Big Data) for logging, and (iv) normalizing and forwarding the input data to the Education Environment and Activities Map Builder in a uniform data model as per its specific type, irrespective of the specific entry point through which the input was received.

Reference is now made to FIG. 3, illustrating the System Front End according to some embodiments of the invention. According to this embodiment, the System Front End module implements Methods and Protocols 310 for receiving and handling various types of inputs from the System's Users Interfaces and from web crawlers. Each received data entity is forwarded to the Front End Dispatcher 320 for internal processing and storage as detailed in the following paragraphs.

Front End Dispatcher 320 identifies the type of each of the data entities that are received by the various entry point handlers of the System Front End 310, and then (i) routes it to the appropriate internal handler (330-339) for processing, for example Pictorial Learning Solution (I-06) inputs are routed to System Front End Learning Solutions Module (FE-05) 334, Educational Institutions Data (I-03) inputs are routed to System Front End Educational Institutions Data Module (FE-03) 332, etc., and (ii) stores each of the received data entities in the system's Resources Repository Data Base 350 and (iii) forwards its associated Session Parameters (I-13) to the Users Sessions Events Logger module 360.

System Front End Educational Learning Sources Module (FE-01) 330 gathers Educational Learning Sources (I-01) from users as described in UI-05, through various entry points 310 such as web service, email hub, fax server etc. Gathered data is extracted through the relevant entry point 310, processed, normalized, formatted and then transferred to the EEA MAP Builder (EM-01) 370 as a uniform data structure that contains (i) all the properties of an Educational Source, for example its name, its identifier, its learning subject category, learning sub-categories, number of pages it contains, number of educational exercises it contains, an image of its external cover page, its related class/grade/level/learning programs etc., and (ii) a time stamp of when the Educational Learning Sources data was received, the user identification of its sender, the entry point through which it was received, etc.

System Front End Education Subjects and Curriculums Module (FE-02) 331 gathers Education Subjects and Curriculums (I-02) from users as described in UI-05, through various entry points 310 such as web service, email hub, fax server etc. Gathered data is extracted through the relevant entry point, processed, normalized, formatted and then transferred to the EEA MAP Builder (EM-01) 370 as a uniform data structure that contains (i) compulsory and optional education subjects in varying levels of detail, and (ii) learning schedules, lists of Educational Learning Sources/courses/assignments etc., that students need to complete in order to graduate a specific course/class/plan etc, and (iii) a time stamp of when the Education Subjects and Curriculums data was received, the user identification of its sender, the entry point from which it was received, etc.

System Front End Educational Institutions Data Module (FE-03) 332 gathers Educational Institutions Data (I-03) from users as described in UI-05, through various entry points 310 such as web service, email hub, fax server etc. Gathered data is extracted through the relevant entry point, processed, normalized, formatted and then transferred to the EEA MAP Builder (EM-01) 370 as a uniform data structure that contains (i) properties of an educational institution, for example its name, type, grades, age ranges, location etc., and (ii) lists learning attributes, for example which Educational Learning Sources are taught from in that educational institution, Education Subjects and Curriculums which are used by that educational institution, etc, and (iii) a time stamp of when the Educational Institution's Data was received, the user identification of its sender, the entry point from which it was received, etc.

System Front End Academic Requirements Module (FE-04) 333 gathers Academic Requirements (I-04) from users as described in UI-05, through various entry points 310 such as web service, email hub, fax server etc. Gathered data is extracted through the relevant entry point, processed, normalized, formatted and then transferred to the EEA MAP Builder (EM-01) 370 as a uniform data structure that contains (i) educational pre-requisites such as academic credits, academic units, compulsory courses, minimal grades etc., that students need to achieve in order to meet certain educational goals, for example maintaining a current study plan level, eligibility for enrollment to a higher course, qualifying for an academic degree, admission to an educational institution, etc., and (ii) a time stamp of when the Academic Requirements were received, the user identification of its sender, the entry point from which it was received, etc.

System Front End Learning Solutions Module (FE-05) 334 gathers Learning Solutions of all types (refer I-06, I-07) from users as described in UI-01, UI-02 and UI-03, through various entry points 310 such as web service, email hub, fax server etc. Gathered data is extracted through the relevant entry point, processed, normalized, formatted and then transferred to the EEA MAP Builder (EM-01) 370 as a uniform data structure that contains (i) all the properties of a learning solution, for example its digital file type, format, a set of parameters that identify the specific item within an Educational Source (I-01) to which the learning content it contains relates (e.g. the learning subject, a textbook's name, page number, educational exercise and sub-exercise number etc.), and (ii) a time stamp of when the Learning Solution was received, the user identification of its sender, the entry point from which it was received, etc.

System Front End Personal Data Module (FE-06) 335 gathers Personal Data (I-08) from users as described in UI-06, through various entry points 310 such as web service, email hub, fax server etc. Gathered data is extracted through the relevant entry point, processed, normalized, formatted and then transferred to the EEA MAP Builder (EM-01) 370 as a uniform data structure that contains (i) information that relates to a specific user of the system (e.g. name, age, gender, educational institution, home area etc), which is entered by that user, and (ii) a time stamp of when the Personal Data was received, the user identification of its sender, the entry point from which it was received, etc.

System Front End Learning Content Requests Module (FE-07) 336 gathers Learning Content Requests (I-09) from users as described in UI-06, through various entry points 310 such as web service, email hub, fax server etc. Gathered data is extracted through the relevant entry point, processed, normalized, formatted and then transferred to the EEA MAP Builder (EM-01) 370 as a uniform data structure that contains (i) information that identifies the desired learning content item, for example its related learning subject, textbook name, page number, educational exercise number etc, and (ii) a set of parameters that identify the specific learning content item within an Educational Source (I-01) to which the Learning Content Request relates to, and (iii) a time stamp of when the Learning Content Request was received, the user identification of its sender, the entry point from which it was received, etc.

System Front End Students Learning Queries/Comments Module (FE-08) 337 gathers Students Learning Queries/Comments (I-10) from users as described in UI-06, through various entry points 310 such as web service, email hub, fax server etc. Gathered data is extracted through the relevant entry point, processed, normalized, formatted and then transferred to the EEA MAP Builder (EM-01) 370 as a uniform data structure that contains (i) comments and/or opinions that a user may add to discussion forums that are associated to each of the learning content items, such as learning solutions and/or explanations to educational exercises from textbooks, homework, or any other educational assignments, in any learning subject, and (ii) a set parameters that identify the specific learning content item within an Educational Source (I-01) to which the learning content that the comment and/or opinion is associated to relates, for example the learning subject, a textbook's name, page number, educational exercise and sub-exercise number etc., and (iii) a time stamp of when the Student's Learning Query/Comment was received, the user identification of its sender, the entry point from which it was received, etc.

System Front End Learning Content Rankings Module (FE-09) 338 gathers Learning Content Rankings (I-11) from users as described in UI-06, through various entry points 310 such as web service, email hub, fax server etc. Gathered data is extracted through the relevant entry point, processed, normalized, formatted and then transferred to the EEA MAP Builder (EM-01) 370 as a uniform data structure that contains (i) quantitative scores (e.g. a score of 3 out of a maximum score of 5) as well as informative opinions (e.g. "The end result is right but I did not understand the calculations"), that a user may add to each learning content item, such as a learning solution and/or explanation to an educational exercise from a textbook, homework, or any other educational assignment, in any learning subject, and (ii) a set parameters that identify the specific learning content item within an Educational Source (I-01) to which the learning content that the Learning Content Ranking is associated to relates, for example the learning subject, a textbook's name, page number, educational exercise and sub-exercise number etc., and (iii) a time stamp of when the Learning Content Ranking was received, the user identification of its sender, the entry point from which it was received, etc.

System Front End Web Crawler Module (FE-10) 339 receives Web Learning Content (I-12) that is gathered by the Crawlers module, through the Web Crawler entry point 310, and performs deeper semantic analysis of this content, to identify its type, for example a newly published schoolbook, and to extract all the available associated data, such as the schoolbook's subject, publisher, table of contents etc. The processed data is normalized, formatted and then transferred to the EEA MAP Builder (EM-01) 370 as a uniform data structure according to its type, for example Educational Source, Educational Institutions Data, Learning Content Request etc.

Reference is now made to FIGS. 7.1, 8.1 and 9.1 illustrating overviews of several processes that involve users' interactions with the system according to some embodiments of the invention. According to these embodiments, blocks 7110, 8110 and 9110 respectively, depict the Network Management and Sharing operations associated with these processes, which are performed by the System Front End as described above.

Reference is now also made to FIG. 7.2 which further illustrates a flow diagram of the Network Management and Sharing operations that are depicted by block 7110 of FIG. 7.1 according to some embodiments of the invention. According to this embodiment, these operations include at least one of the following steps by the System Front End module: Receive requests for solutions of exercises, learning queries and uploaded solutions for exercises from the users' network sharing application (step 7210), and, Provide registered and non-registered users varying levels of access to the contents of the Education Environments and Learning Patterns Database (step 7240).

Reference is now also made to FIG. 8.2 which further illustrates a flow diagram of the Dynamic Map Updating operations that are depicted by block 8140 of FIG. 8.1 according to some embodiments of the invention. According to this embodiment, these operations include the following step by the System Front End module: Receive new entities records and data for creating new entities, and requests for customized personal reports from the users' network sharing application (step 8210).

Reference is now also made to FIG. 9.2 which further illustrates a flow diagram of the Dynamic Map Updating operations that are depicted by block 9140 of FIG. 9.1 according to some embodiments of the invention. According to this embodiment, these operations include the following step by the System Front End module: Receive new entities records and data for creating new entities, and requests for Organizational/Sectoral reports from the users' network sharing application (step 9210).

Resources Repository Data Base

Resources Repository Data Base is a dedicated database for storing and managing the data, resources and materials, which are continuously received as inputs from users of the system as well as gathered and collected by the various input modules of the system.

The Resource Repository Data Base stores and manages data, resources and materials such as Educational Learning Sources (I-01), e.g. textbooks, educational exercises and problems, exams and homework assignments, Education Subjects and Curriculums (I-02), e.g. subjects, topics and subtopics, planned missions, and learning activities, Educational Institutions Data (I-03), including cities and locations, Academic Requirements (I-04), Various types of Learning Solutions (I-06, I-07), Personal Data (I-08), e.g. students and teachers and their respective geographical locations e.g. cities and locations, Learning Content Requests (I-09), Students Learning Queries/Comments (I-10) and Learning Content Rankings (I-11).

Users' inputs and gathered data are indexed and organized so that they may facilitate a simple, intuitive and responsive user experience when serving users' requests for stored data and resources that are provided by the system, for example—retrieving and serving Pictorial and Textual Learning Solutions to educational exercises, retrieving Users' data for verifying log-in procedures, retrieving and serving Textbooks, Educational Institutions and Learning Curriculums information when users search for learning solutions to educational exercises in their homework assignments, providing visual and auditory tutorial and guidance Education materials.

The Resource Repository Data Base is also responsible for storing and managing the data, resources and materials needed for establishing and managing the system's huge on-line professional community of students, teachers, parents and education personnel which provides users with rich social activities such as messaging, commenting, grading, participating in forums as well as creating social circles and learning groups.

The data, resources and materials stored in the Resources Repository Data Base are also used by the Education Environments Maps Builder and the Education Environments Synthesis Engine as an updated data repository for maintaining, improving and enhancing the EEA Map knowledge base.

Users Sessions Events Logger

Users Sessions Events Logger gathers Session Parameters (I-13) that are associated with all the operations/activities, which are carried out by users while interacting with the system. The gathered data is indexed, normalized, stored, and may then be used as inputs for (i) creating networks of interrelations between Educational Information items by the Education Environments and Activities Maps Builder, and (ii) creating dynamic maps of students' actual learning activities/usage, by the Education Environments and Activities Maps Builder.

Education Environments and Activities Map System Modules

This section describes the main data structures, processes and algorithms used by the computerized system modules that handle the system's Education Environments and Activities Map, namely the Education Environments and Activities Map Builder (EEA Map Builder), the Education Environments and Activities Map Manager (EEA Map Manager), the Patterns and Knowledge Base of Education Environments and Activities Map (EEA Map) and the EEA Map Synthesis Engine.

Data that is constantly gathered and pre-processed by System Front End modules is used by the EEA Map Builder for initialization and updating of the data structures of the dynamic EEA Map, via services that are provided by the EEA Map Manager, which in turn handles the relevant processes, methods and algorithms for continuous maintenance, refinement and enhancement of these data structures. The EEA Map Manager also works in tandem with the EEA Map Synthesis Engine, which applies sophisticated algorithmic and calculative methods to constantly analyze, deduce, modify and expand the dynamic data structures of the EEA Map. Each of these modules is described in detail in the following sub-sections.

Education Environments and Activities Map—EEA Map (EM-02/1)

An EEA map is a large-scale multi-dimensional directed graph data structure, which dynamically maintains and represents the overall picture of education entities, resources, people and activities that are gathered, collected and accumulated by the system for a given region where the system is deployed.

The Nodes of an EEA Map represent the education entities, resources, people and activities from the specific region that is represented by this map, for example:
  Educational Learning Sources (I-01), such as textbooks, educational exercises and problems, exams and homework assignments.
  Education Subjects and Curriculums (I-02), such as subjects, topics and subtopics, planned missions, and learning activities
  Educational Institutions Data (I-03), including cities and locations
  Academic Requirements (I-04),
  Various types of Learning Solutions (I-06, I-07),
  Personal Data (I-08), including (Students and teachers) and geographical locations (cities and locations)
  Learning Content Requests (I-09),
  Students Learning Queries/Comments (I-10),
  Learning Content Rankings (I-11),
  Session Parameters (I-13) such as computer type, web browser, method of interaction with the system, region, navigation path, history of visits etc, that are logged during routine activities/usage by users.

The Edges of an EEA Map represent relations and connections between the education entities, resources, people and activities from the specific region that is represented by this map, and may have values such as: "belongs", "covers", "studied", "requested", "navigated from to", "is synonym to" etc.

The combination of Node-Edge-Node is a basic object in an EEA Map, which represents a single relation and connection between two education entities, resources, people or activities from the specific region that is represented by this map, for example:
  Educational Institution "belongs" to city,
  Topic "belongs" to subject,
  Subject "is synonym to" subject,
  Subject "studied" in educational institution,
  Textbook "covers" subject,
  Educational exercise "covers" topic,
  User "requested" learning solution to educational exercise,
  User "navigated from to" educational exercise to educational exercise
  User "has social connection" with other user An EEA Map contains complex sets of relations and connections between vast amounts of objects that may belong to any of the education entities, resources, people and activities from the specific region that is represented by this map, each of which has its associated time stamp. These complex sets of relations and connections represent the abundant knowledge that is generated and aggregated in the system, for example: organizational structures of schools and educational institutions, educational learning sources for specified topics, user navigation paths and histories, learning topics and areas of relative difficulty, learning requirements and pre-requisites, semantic relationships rules, etc. This large group of multi-disciplinary sets of relations and connections creates a huge multi-domain and multi-aspect representation of the education entities, resources, people and activities of a given region, and forms a complex N-dimensional data structure which can only be of practical value if represented and implemented as an extensive collection of clustered directed graph data structures. Since it is impossible to identify the map's objects and recognize the real structure of an EEA Map using standard available human visualization means, the only way to derive and achieve meaningful value and outcome from analysis of an EEA Map is by applying sophisticated computerized algorithmic and calculative methods for extracting data and knowledge.

A basic element in enabling the implementation of sophisticated dynamic analysis of the information contained by an EEA Map is the association of properties to the objects that are embedded in its directed graph data structures. Each of the Nodes and the Edges of an EEA Map may have multiple properties such as name, relevant time stamp, weight, domain, aspect, importance level, change rate, etc., which enable aggregating and creating specific projections/views and cross sections of sub-sets of EEA Map objects based on values of these, as shall be detailed below.

Reference is now made to FIGS. 7.1, 8.1 and 9.1 illustrating overviews of several processes that involve users' interactions with the system according to some embodiments of the invention. According to these embodiments, blocks 7140, 8150 and 9150 respectively, depict the Patterns and Knowledge Base of Education Environments and Activities Map—EEA Map, as described above.

Education Environments and Activities Map Manager—EEA Map Manager (EM-02/2)

The EEA Map Manager contains self-maintenance modules of the system that constantly sample, re-calculate and dynamically update properties of the EEA Map objects.

FIG. 4.0 illustrates a flow diagram of the internal logic and processes of the EEA Map Manager module, according to some embodiments of the invention. According to this embodiment, the EEA Map Manager module is initialized with a fractional and incomplete map of the education entities, resources, people and activities in a given region 410, and then, periodically, as new education data is accumulated, missing information is added 420, and relationships of both connected and orphan entities are complemented, for example updating and/or adding new connections between a learning subject, and an educational source used for teaching this learning subject, and a new exercise belonging to this educational source.

EEA Map objects are sampled, re-calculated and their properties are dynamically updated 430, for example—a specific exercise's difficulty level property may be updated to reflect changes in the amount of demands for its solution by students. Some properties such as an object's name and date of creation are static by nature, their values are relatively constant, and will therefore be sampled at large time intervals, while other properties such as weight, relevant time stamp and change rate may be more dynamic in nature, depending on the domain to which they belong, thus their values will be sampled and updated more often. Following are several examples:

The Edge "belongs" that is a member of the "Organizational Structure Relations" domain will typically have a low change rate value, which reflects its less-than-average dynamic nature.

The Edge "covers" that is a member of the "Learning Resources Relations" domain will typically have a medium change rate value, which reflects its average dynamic nature.

The Edge "navigated from to" that is a member of the "User Navigation Between Resources Relations" domain will typically have a high change rate value, which reflects its highly dynamic nature.

The mechanism of associating properties to EEA Map objects also enables dynamic evaluation of various attributes of the objects of an EEA Map, for example calculating the relative current relevance of their relations and the current strength of relations between entities that are represented in the EEA Map.

The information contained by an EEA Map may be further enhanced by the capability to dynamically associate new properties to any of its embedded objects, during system operation 440. This is an effective mechanism to provide additional system flexibility for coping with new conditions or requirements, for example, adding a property that describes characteristics of student's learning curve per subject such as Estimated Qualification. Relations between objects in the EEA Map such as learning subjects, education exercises and learning programs are re-factored, re-clustered and reorganized 450 according to knowledge that is derived from users' activities, such as learning queries, requests for solutions and uploaded solutions to exercises.

When required 455, specific projections and views of an EEA Map, which contain Edges and Nodes that are relevant to given domain and aspects, can be extracted from an EEA Map of a given region to form Partial EEA Maps. The intelligent slicing of an EEA Map in order to generate Partial EEA Maps is performed by sets of Heuristically Greedy computerized algorithms, optimized for the domains and aspects of the various objects of the EEA Map, which identify and extract partial projections from the EEA Map by analyzing the current/historical values of their internal objects' properties, according to their time stamps where relevant 460, for example—paths of student navigations in the domain of educational learning programs and learning subjects relative to a timeline and/or predefined learning schedule. The Partial EEA Maps that are produced by these identification and extraction algorithms are then drilled down and re-aggregated to form normalized, self-contained data structures, which are separate from the rest of the information in the EEA Map 470. These Partial EEA Maps may then be heuristically enhanced in order to compensate for lack of information, close information gaps and provide sufficient data and information for generating the outputs of the system (see System Outputs description) 480.

Partial EEA Maps are by definition temporary and non-complete sub-sets of a dynamic EEA Map, thus they cannot independently evolve over time and are only used as snapshots of a given map dimension at a given moment. The period of time for which the relevance of a specific Partial EEA Map is valid depends on the values of the properties of its member objects such as Importance Level, Change Rate, and Domain. The period of relevance of each of the Partial EEA Maps is constantly calculated and updated by the self-maintaining modules of the EEA Map Manager.

FIG. 4.1 illustrates an example of a Partial EEA Map depicting the data and knowledge regarding the structure of specified Educational Organizations and Education Subjects, according to some embodiments of the invention. According to this embodiment, a learning process is comprised of educational assignments and exams that are related to a learning curriculum, therefore Educational Assignment entities 4110 and Exam entities 4120 have "belongs" relations with Curriculum entities 4130. A curriculum typically covers at least one education topic, therefore Education Topic entities 4140 have "belongs" relations with Curriculum entities 4130. An education subject is comprised of at least one education topic, therefore Education Topic entities 4140 also have "belongs" relations with Education Subject entities 4150. Education subjects are typically taught in education institutions, therefore Education Subject entities 4150 have "studied" relations with Education Institution entities 4160. Education institutions may adopt a certain curriculum for teaching topics of a certain subject, therefore Curriculum entities 4130 may have "belongs" relations with Education Institution entities 4160. An education institution physically resides at a certain location such as a town, city or state, therefore Education Institution entities 4160 have "belongs" relations with Location entities 4170.

FIG. 4.2 illustrates an example of a Partial EEA Map depicting the data and knowledge regarding the structure of specified Learning Processes as Planned by a specified Organization (Education Subjects and Curriculums, Academic Requirements etc), according to some embodiments of the invention. According to this embodiment, a learning process is comprised of educational assignments and exams that are related to a learning curriculum, therefore Educational Assignment entities 4210 and Exam entities 4220 have "belongs" relations with Curriculum entities 4230. A curriculum typically covers at least one education topic, therefore Education Topic entities 4240 have "belongs" relations with Curriculum entities. An education subject is comprised of at least one education topic, therefore Education Topic entities 4240 also have "belongs" relations with Education Subject entities 4250. Education subjects are typically taught in education institutions, therefore Education Subject entities 4250 have "studied" relations with Education Institution entities 4260.

FIG. 4.3 illustrates an example of a Partial EEA Map depicting the data and knowledge regarding the structure of a specified Learning Subject and Educational Learning Sources (Text Books, Educational Exercises, Paper Written Learning Solutions, Pictorial Learning Solutions, Textual Learning Solutions), according to some embodiments of the invention. According to this embodiment, educational exercises originate from textbooks, therefore Educational Exercises entities 4310 have "belongs" relations with Text Book entities 4320, and since each educational exercise covers a certain educational topic, Educational Exercises entities also have "covers" relations with Educational Topic entities 4330. Textbooks typically cover certain educational topics, therefore Text Book entities 4320 have "covers" relations with Educational Topic entities 4330, and since each textbook also belongs to at least one educational topic, Text Book entities 4320 also have "belongs" relations with Educational Subject entities 4340. Each educational topic belongs to at least one educational subject, therefore Educational Topic entities 4330 have "belongs" relations with Educational Subject entities 4340.

FIG. 4.4 illustrates an example of a Partial EEA Map depicting the data and knowledge regarding the structure of Actual Learning Processes as Performed by a specified student (Student Navigation), according to some embodiments of the invention. According to this embodiment, the specified student is represented by an entity 4410, which has "requested" relations with several other entities of solutions to learning exercises 4420, depicting that these solutions were requested by the student during the analyzed timeframe. These exercises have "covers" relations with several other entities of education topics 4430, depicting that the student was studying these specific education topics during the analyzed timeframe. Time based analysis of the student's requests for solutions to learning exercises produces the student's navigation sequence, which depicts the actual learning process performed by the specified student while studying certain education topics during the specified timeframe.

The continuous process of accumulating and updating of new data that has been described in previous sections (see System Inputs, System Front End descriptions), triggers constant addition and updating of EEA Map objects as well as activating ongoing and continuous processes for self-refactoring, re-clustering and reorganization of relations between objects in the EEA Map, which are part of the infrastructure of the EEA Map software modules. The dynamic changes in the content of an EEA Map hint at the incomplete nature of EEA Maps, which is substantially different from that of the normalized and constrained structure of traditional relational model databases or any other known data repository management system, and therefore dictates the need for development of customized software which supports the dynamic data structures of EEA Maps and their associated continuous self-maintenance software modules.

FIG. 4.5 depicts an example of the ability to add missing information, and complement relationships of both connected and orphan entities, as new data is accumulated, discovered or clarified by the EEA Map Builder, by enhancing an Educational Source in an EEA Map. The EEA Map Builder module initiates a periodic search for objects in the EEA map that may be enhanced 4510, and then if an Educational Source object that is connected to a Subject object is found 4520, and then if enough time has passed since the last time this Education Source was updated 4530, and then if the Subject object is connected to a School object 4540, a new connection between the School object and the Educational Source object is created 4550, and the processing timestamp of the Educational Source object is updated 4560.

Since it is also designed to maintain conflicting pieces of data, the EEA Map Manager is capable of activating an ongoing analytical mechanism for detection and resolving of conflicts As Map connectivity grows over time, Edges are constantly added and distinct clusters of interconnected objects can be automatically identified and combined by adding additional relations into bigger clusters. Following are a few examples of dynamic EEA Map adjustments and re-clustering:

Students are identified and clustered as "Colleagues" by having sets of mutually referenced books and educational exercises or by being related to the same educational institution and grade;

Consistent sets of repeating "subject-educational exercise" relation patterns are identified and clustered as "Exams and or Homework Assignments" when they are "requested" by multiple users from the same educational institution or grade per a given subject;

New "covers" relations between books and topics are discovered by analyzing educational exercises and learning solutions reported by students;

"belongs" relations between students and educational institutions/locations are discovered when students choose to narrow books search by educational institution/location.

An important feature of the EEA Map infrastructure is the ability to contain represent and maintain a variety of Semantic Data Structures and Dictionaries that can be used for representing and maintaining dynamic Domain Concept Trees, which will be used for various purposes such as normalizing the EEA Map objects data and assist in understanding and building Partial EEA Maps, for example:

The Educational Learning Sources domain of an EEA Map can contain semantic sub-trees of concepts of many levels for the particular domain. The following example describes semantic rules that are related to the "Math-Geometry-$7^{th}$ Grade" sub-tree leaf:

Rectangle "is child concept" of parallelogram,

Parallelogram "is child concept" of quadrilateral,

Quadrilateral "is child concept" of polygon

Semantic relationships between concepts are implemented using "semantic" EEA Map Edges, which describe relationships in language-specific semantic information, such as "common synonym" (e.g. economics-commerce) and "stop word" that has no practical relevance and should be ignored (e.g. cool, super, funky etc.).

The continuous accumulation, addition and refinement of semantic rules allows the system to (i) perform more effective keyword searches for language specific synonyms and varying users' terminologies that refer to education entities from the real world, and (ii) enables sophisticated qualitative analysis, for example—providing a more effective way of ranking learning solutions by relevancy, or by extending the re-clustering of Partial EEA Maps to broader aspects which have similar and/or close meanings.

Management of semantic relationships may require the involvement and interaction of human experts with the system for editing relations and dictionary objects of the EEA Map, which are relevant to the semantic domain trees in order to refine and improve semantic rules.

Reference is now made to FIG. 7.1 illustrating an overview of a computerized system for aggregating queries and solutions and identifying behavioral education learning process of students, and to FIG. 7.3 which further illustrates a flow diagram of the Learning Patterns Identification operations that are depicted by block 7150 of FIG. 7.1 according to some embodiments of the invention. According to this embodiment, these operations include at least one of the following steps by the EEA Map Manager module: Analyze all requests for solutions of exercises, learning queries and uploaded solutions for exercises, in relation to educational learning programs and learning subjects (step 7310), Identify from the results of the analysis behavioral education learning processes of individuals and/or groups of students (step 7320), Perform statistical and pattern comparisons between current education learning processes of individuals and groups to historical analysis data (step 7330) and, Identify repeating behavioral education learning processes of students (step 7340).

Reference is now also made to FIG. 8.1 illustrating an overview of a computerized system for analyzing behavioral education learning processes of students, and to FIG. 8.2 which further illustrates a flow diagram of the Dynamic Map Updating operations that are depicted by block 8140 of FIG. 8.1 according to some embodiments of the invention. According to this embodiment, these operations include the following step by the EEA Map Manager module: Update the Education Environments and Learning Patterns Database entities' relations and entities' attributes, and history of students' learning queries and requests for solutions relating to education exercises over time based on the received entities records and data (step 8220).

Reference is now also made to FIG. 9.1 illustrating an overview of a computerized system for identifying dynamic behavioral patterns of students, and to FIG. 9.2 which further illustrates a flow diagram of the Dynamic Map Updating operations that are depicted by block 9140 of FIG. 9.1 according to some embodiments of the invention. According to this embodiment, these operations include the following step by the EEA Map Manager module: Update the Education Environments and Learning Patterns Database entities' relations and entities' attributes, and history of students' learning queries and requests for solutions relating to education exercises over time based on the received entities records and data (step 9220).

The EEA Map Synthesis Engine (EM-03)

The EEA Map Synthesis Engine is the sophisticated analytical component of the EEA Map, which operates continuously and is responsible for the constant refinement, and enhancement of EEA Map objects and completion of Partial EEA Maps structures, according to sets of rules, acting as a rule-based expert system with a built-in inference engine, which enables identification and extraction of graph patterns, either with or without timeline analysis. FIG. 5.0 illustrates a flow diagram of the internal logic and processes of the EEA Map Synthesis Engine (EM-03) module, according to some embodiments of the invention. According to this embodiment, the EEA Map Synthesis Engine module checks periodically to determine if the system has received a request for a new report (step 510). Handling a request for a report will typically require further refinement of the EEA map according to the specific contents of this request, therefore the request is first converted to the EEA map analysis generating language (step 520), and then dispatched for processing according to its type (step 530), and then the contents of the specific request are used in order to identify relevant potentially highly connected clusters of objects, for example clusters of education exercises that are related to the specific learning subject that is included in the request (step 540), and then the relevant EEA Map objects are refined and enhanced, and Partial EEA Maps structures are completed according to the content of the specific user request and to related sets of rules (step 550), and then if the user request is for a Sectoral report, gap analysis and behavioral patterns analysis methods are applied on the Partial EEA Maps which represent actual learning processes relative to a timeline, in order to generate Sectoral reports, for example: Education Analytics, Students Usage Analytics (step 560). If the user request is for a Personal report, then typical paths of students' navigations in the domain of learning subjects and education exercises are Identified in order to enable building and producing Partial EEA Maps which represent actual learning processes (step 570), and then personal learning patterns in learning subjects analyzed and compared to statistical "Typical Students Learning Paths/Schedules" for each learning subject, in order to grade relevant aspects and properties of the student's activities (step 580), and then based on the results of the personal learning analysis process, customized personal reports are created according to the request, for example: Assessments of Personal Academic Skills, Custom Study Plans, Personal Preparation and Guidance Plans for Exams (step 590).

The Synthesis Engine rule based mechanism maintains rules of graph patterns that can be identified and extracted from the EEA Map objects, namely small graphs data structures representing typical real life structures, features, states or situations that can become the basis for automatic patterns recognition, which can then lead to actions, such as creating new graph nodes and edges.

FIG. 5.1 illustrates an example of a simple graph pattern that depicts rule based recognition of missing relation that results in a "create relation" action, according to some embodiments of the invention. According to this embodiment, the rule defines that if an Educational Exercise entity 5110, has a "covers" relation with an Educational Topic entity 5120, and also has a "belongs" relation with a specific Text Book entity 5130, then if the specific Text Book entity does not already have a "covers" relation with the Educational Topic, then a new "covers" relation is created from the Text Book entity to the Educational Topic entity It is important to note that rule graph patterns are not limited to any specific aspect, domain or dimension of EEA Maps and can be identified, extracted and applied on the multiple dimensions of an EEA Map. For example, missing Learning Resources and incorrect Organizational Structure may be inferred and corrected by applying User Navigation rule graph patterns.

As the EEA Map grows and accumulates Student Navigation data and statistics, the EEA Map Synthesis Engine plays a major role in identifying potentially highly connected clusters of objects, as per user requested/specific outputs, and enables the system to provide meaningful, practical and productive outputs (see System Outputs description).

A typical process that identifies highly connected clusters of Educational Exercises, and enables re-clustering in a useful data structure is based on the following principles:
  Nodes in the cluster represent "Educational Exercises";
  Each node in the cluster is connected to at least N other nodes with edges of type "navigated" (signifying that users requested learning solutions for educational exercise in a sequence);
  At least one of each node's outgoing edges has weight (number of navigations) greater then M, representing a "Typical Path" of a typical student learning a "Subject". Typical path is a statistically most common navigation scenario in a cluster performed by the majority of students.

FIG. 5.2 illustrates an implementation of the above principles on the case of identifying and adding an unmarked educational exercise and to an existing cluster, according to some embodiments of the invention. According to this embodiment, the EEA map is checked periodically for Educational Exercise entities that are not associated to any existing clusters (step 5210), and then if such an entity is found and enough time has passed since it was last checked (step 5220), then it is checked to determine if it has unmarked navigation link relations (step 5230), and then if the Educational Exercise entity that is not associated to any existing cluster has unmarked navigation link relations with an existing cluster (step 5240), then the Educational Exercise entity is also marked as associated to this cluster (step 5250), and all its unmarked navigation links are marked as associated to this cluster (step 5260), and the time stamp for its next periodic check is updated accordingly (step 5270).

Knowing the "Connected Educational Exercises" clusters and the "Typical Paths", the computerized system is able to assess and output the following:

The relative Degree of Difficulty of educational exercises (cross compared with the difficulty of educational exercises as reported by students explicitly), the individual Student's Progress as compared to the statistical distribution, and the Recommended Learning Path for a specific student based on his learning curve so far.

The EEA Map Synthesis Engine is a key component in the system's ability to identify the actual map of Education and Learning processes since it enables studying and cataloging of the actual typical paths of student navigations in the world of education subjects and topics and thus enables building and producing Partial EEA Maps of actual learning processes, as opposed to theoretical plans composed and published by educational institutions. These maps, after break down by institution, grade, subject and location, may provide valuable information for educational authorities of all levels (see System Outputs description).

Reference is now made to FIG. 8.1 illustrating an overview of a computerized system for analyzing behavioral education learning processes of students, and to FIG. 8.2 which further illustrates a flow diagram of the Dynamic Map Updating operations that are depicted by block 8140 of FIG. 8.1 according to some embodiments of the invention. According to this embodiment, these operations include the following step by the EEA Map Synthesis Engine: upon request for customized personal reports, update students' learning progress related to educational exercises, subjects and curriculums based on the tracked history of students' learning queries and requests for solutions relating to education exercises, over time (step 8230).

Reference is now also made to FIG. 8.3 which further illustrates a flow diagram of Dynamic Map Analyzing Module operations that are depicted by block 8160 of FIG. 8.1, according to some embodiments of the invention. According to this embodiment, these operations include at least one of the following steps by the EEA Map Synthesis Engine: Identify dynamic behavioral patterns from students' activities of submitting learning queries, requests for solutions, and reception of solutions for educational exercises (step 8310), Perform a time based analysis of each student's behavioral activities, in order to produce a representation of patterns according to parameters such as timeline, geographical area, culture, language, teaching methods, grades, learning subjects, etc. (step 8320), and, Perform statistical and pattern comparisons between education learning processes of individuals and groups to historical analysis data (step 8330).

Reference is now also made to FIG. 9.1 illustrating an overview of a computerized system for identifying dynamic behavioral patterns of students, and to FIG. 9.2 which further illustrates a flow diagram of the Dynamic Map Updating operations that are depicted by block 9140 of FIG. 9.1 according to some embodiments of the invention. According to this embodiment, these operations include the following step by the EEA Map Synthesis Engine: Organizational/Sectoral reports, update students' learning progress related to educational exercises, subjects and curriculums based on the tracked history of students' learning queries and requests for solutions relating to education exercises, over time (step 9230).

Reference is now also made to FIG. 9.3 which further illustrates a flow diagram of Dynamic Behavioral Patterns Identification operations that are depicted by block 9160 of FIG. 9.1, according to some embodiments of the invention. According to this embodiment, these operations include at least one of the following steps by the EEA Map Synthesis Engine: Deduce, extract and slice relevant data from the system's EEA Map according to the specific requested scope and aspects that are of interest (step 9310), Apply a variety of methods and algorithms to generate big data customized reports according to the specific requested scope and aspects (step 9320).

Education Environments and Activities Map Builder—EEA Map Builder (EM-01)

The EEA Map Builder is responsible for building the initial EEA map, and for insertion and updating an existing EEA Map with pre-processed data that is received from the System Front End.

The EEA Map Builder is designed to be performance efficient, therefore it minimizes the duration of a map's initial building process by creating only a preliminary structure of Nodes and Edges that represents the real life entities and relations that it identifies from inputs, leaving the ongoing maintenance, extensive analysis and continuous improvement of the map to the EEA Map Manager and EEA Map Synthesis Engine, as detailed in the descriptions of these modules.

For reasons of performance and scalability, initial insertion of pre-processed data that is received from the System Front End into the EEA Map is handled internally by two sub-modules: the Education Environments Map Builder, which handles data originating from educational organizations/institutes (see System Front End outputs FE-01 . . . FE-04, FE-10), and the Education Activities Map Builder, which handles data originally created by users (see System Front End outputs FE-05 . . . FE-10). When receiving pre-processed incoming data from the relevant System Front End module, both sub-modules of the EEA Map Builder operate according to the following principles:

Search for existing EEA Map Nodes that correspond to the incoming data;

If not found, create a new Node, stamped with the relevant time, search for similar (correlating) Nodes, and connect the new Node to each of the similar Nodes with a "preliminary association" relation, for further analysis at a later stage;

If no similar Nodes are found, create a new disconnected orphan Node, stamped with the relevant time;

Try to match a new incoming relation to existing relations and update existing relations data if found;

If existing relations were not found, create a new relation, stamped with the relevant time.

FIG. 5.3 illustrates an implementation of the above principles for processing incoming Educational Source Data in an EEA Map, according to some embodiments of the invention. According to this embodiment, incoming data that is received from the system front end (step 5310) is checked to determine if it contains an Educational Source (step 5135). If the data contains an Educational Source, the system's EEA map is checked to determine if it already contains this Educational Source (step 5320). If the EEA map already contains this Educational Source, its entity is updated according to the contents of the incoming data (step 5325). If it is not contained in the EEA Map, a new Educational Source entity is created and added (step 5330). The new/updated Educational Source is checked to determine if it is related to any specific school (step 5335), and if so, if the specific school already exists in the EEA map (step 5340). If there is a school that is related to the Educational Source but it does not currently exists in the EEA map, a new School entity is created and added (step 5345). If the Educational Source and School entities already have an existing relation, it is updated according to the contents of the incoming Educational Source data (step 5355). If there isn't an existing relation between the entities, a new relation is created according to the contents of the incoming Educational Source data (step 5360).

Reference is now made to FIG. 7.1 illustrating an overview of a computerized system for aggregating queries and solutions and identifying behavioral education learning process of students, and to FIG. 7.2 which further illustrates a flow diagram of the Network Management and Sharing operations that are depicted by block 7110 of FIG. 7.1 according to some embodiments of the invention. According to this embodiment, these operations include at least one of the following steps by the EEA Map Builder: Create new associations between requests for solutions of exercises, learning queries and uploaded solutions for exercises to objects that are already in the Education Environments and Learning Patterns Database based on an index for mapping exercises to their educational sources (step 7220), and then Update the Education Environments and Learning Patterns Database with the newly created associations (step 7230).

System Outputs

The System Outputs provides reports that best reflect the unique ability of the system to combine the knowledge and data accumulated in the EEA Map and automatically generate outputs which are of high productive value to individuals and organizations. Reference is now made to FIG. 6 illustrating the System Outputs controls, according to some embodiments of the invention. According to this embodiment, an Output Report Type selector 610 enables users to specify the required type of output, for example a Custom Study Plan report or an Education Analytics report. An Output Report Control selector 620 enables users to further specify report specific controls, for example the required learning subject for a Custom Study Plan report, or the required school grades for an Education Analytics report. The Outputs Control Display 630 is the display area for report that was specified by the user.

System Outputs can be easily defined, configured, automatically generated and delivered by authorized users of the system via comprehensive user interface means and controls depicted in FIG. 6. The available types of reports as well as parameters such as scope, range, level of details etc. are set according to user's credentials and privileges, applying severe strictness on data privacy regulations and best practices.

System Outputs are grouped to (i) Personal Reports and (ii) Organizational and Sectoral Reports, according to their target audience and scope as described by the examples in the following sections, and are received by users through their Communication Terminals (refer blocks 7120, 8120 and 9120 of FIGS. 7.1, 8.1 and 9.1 respectively)

Personal Reports

System outputs of all types are generated upon requests by users, and are based on the most up-to-date knowledge that has been gathered, acquired, collected, accumulated, analyzed and extracted from the EEA Map by the system upon such requests.

Personal and personalized outputs such as custom study guides and preparation plans for exams, academic skills assessment reports and achievement levels grading, recommendations for suitable plans, guides and fields of studies etc., are generated by the system according to the following common principles:

An individual student's learning patterns in all education subjects are compared to statistical "Typical Students Paths" that are continuously updated by the system for these subjects.

The results of this comparison are analyzed by the system to grade relevant aspects and properties of the student's activities, for example:

The Intensity of Homework Assignment Preparation by the specific student

The Tendency for Deep Understanding of the Material (for example by analyzing the histogram of time periods between requesting learning solutions, reading solutions, ranking solutions, commenting on solutions, etc.)

The Level of Difficulty of Educational Exercises that the given student needs help with The Synthesis Engine rule base mechanism uses these calculated grades to deduce the student's achievements in specific subjects and her potential in various educational fields, as a basis for generating personal and personalized reports, as detailed in the the examples in the following sub-sections.

Grading of Personal Achievement Levels (O-01) are reports that list the subjects/topics that students learn for example mathematics, social science, history etc., and grade a student's achievement levels in each of these subjects/topics, both in absolute values as well as percentiles (e.g. relative to peers, requirements etc).

Grading of Personal Achievement Levels in absolute values can be performed for example by (i) comparing the "Levels of Difficulty" of educational exercises that the given student needs help with to the levels of difficulty required by the relevant curriculum (state or district approved curriculum for the student's grade), and then (ii) assigning quantitative (numerical) values to the results of the comparison.

Grading of Personal Achievement Levels relative to peers can be performed for example by assigning quantitative (numerical) values to the results of the comparisons between the individual student's learning patterns in all education subjects and the correlating statistical "Typical Students Paths".

Assessments of Personal Academic Skills (O-02) are reports that list academic fields that are related to the subjects/topics that students learns for example computer sciences, psychology, social work etc., and provide each student with an assessment of her suitability for relevant academic fields, both as quantitative values and as percentiles (i.e. suitability relative to peers).

Assessments of Personal Academic Skills in quantitative values can be performed for example by (i) using a set of rules to create a list of academic fields that correlate to the education subjects/topics of the given student, and then (ii) sorting the resulting list of academic fields according to the absolute Achievement Levels (see O-01) that were calculated for the given student in the correlating education subjects/topics.

Assessments of Personal Academic Skills relative to peers can be performed for example by (i) using a set of rules to create a list of academic fields that correlate to the education subjects/topics of the given student, and then (ii) sorting the resulting list of academic fields according to the relative Achievement Levels (see O-01) that were calculated for the given student in the correlating education subjects/topics.

Personal Recommendations of Academic Opportunities (O-03) are prioritized lists of academic opportunities such as undergraduate courses' openings, seminars, extracurricular activities etc., that are recommended to students, based on their Personal Academic Skills Assessments (see O-02) and the results of a Gap Analysis study which takes into account the various levels and weights of learning efforts, preparations, time and resources required from the student in order to reach the recommended academic opportunities.

Personal Recommendations for Professions (O-04) are prioritized lists of fields of occupations such as, social work, information technology, health care, education, financing etc., as well as specific positions within these fields such as group counseling computer systems analysis, physical therapy, teaching, accounting etc., that are recommended to students, based on their Personal Data (I-08), Academic Skills Assessments (see O-02) and the results of a Gap Analysis study which takes into account the various levels and weights of learning efforts, preparations, time and resources required from the student in order to excel and benefit from the recommended profession and area of activity.

Personal Recommendations for Jobs (O-05) are prioritized lists of employment, jobs and/or assignment opportunities such as summer jobs, internships, part/full time employment offers etc., which are recommended to students, based on their Personal Academic Skills Assessments (see O-02) and the results of a Gap Analysis study which takes into account the various levels and weights of learning efforts, preparations, time and resources required from the student in order to be accepted to the recommended employment and/or assignment opportunities.

Custom Study Plans (O-06) are prioritized lists of links to practice educational exercises, tutorial exercises etc., which are targeted to reinforce students in any subject/topic, at any level, based on their Personal Achievement Levels (see O-02). The practice educational exercises in the custom study plan for a specific topic are prioritizes based on the student's specific skill and learning properties such as (i) weakness in absolute terms, of specified student in specified topic (ii) increasing level of difficulty related to the specific learning topic and (iii) productive learning curve pattern.

Personal Preparation and Guidance Plans for Exams (O-07) are prioritized lists of links to practice educational exercises, previous exams, tutorial exercises etc., which are targeted to reinforce students in subjects/topics that are included in the scopes of their exams, based on their Personal Achievement Levels (see O-02). The educational exercises in the personal preparation and guidance plan for a specific exam scope and requirements are prioritizes based on the student's specific skill and learning properties such as (i) weakness in absolute terms, of specified student in specified topics covered by the specific exam (ii) increasing level of difficulty related to the specific learning topic and (iii) productive learning curve pattern.

Reference is now also made to FIG. 8.1 illustrating an overview of a computerized system for analyzing behavioral education learning processes of students, and to FIG. 8.3 which further illustrates a flow diagram of Dynamic Map Analyzing Module operations that are depicted by block 8160 of FIG. 8.1, according to some embodiments of the invention. According to this embodiment, these operations include at least one of the following steps by the System Outputs: Estimate the learning achievement/progress of a student or of a group of students over time, relative to a planned learning curriculum (step 8340), Estimate the learning achievement/progress of a student or of a group of students over time, relative to the learning achievements/progress of any other group of one or more students (step 8350), Generate custom study plans, which are targeted to reinforce students in any subject/topic, at any level, based on their learning achievement/progress (step 8360).

Organizational and Sectoral Reports

Big data statistical and analytical customized reports that are of value to institutions organizations and companies are deduced, extracted and cross sectioned from the system's EEA Map according to the specific requested scope and aspects that interest a specific institution and company or a specific sector of organizations such as the education, industry or government domains.

The Synthesis Engine rule base mechanism uses a variety of Pattern Recognition and Gap Analysis methods and algorithms as a basis for generating big data customized reports as detailed in the examples in the following subsections.

Education Analytics (O-08) are statistical and analytical data reports deduced and extracted from the system's EEA Map that are of value to institutions and departments of education, for example (i) relative/absolute achievements levels of educational institutions, communities, districts and states, (ii) breakdown of academic skills by educational institutions, communities districts and states, (iii) relative/absolute achievement levels for different curriculums, and (iv) educational content that is most widely accessed by students of an educational institution, community, district or state at given periods of time, etc. Education Analytics are produced by applying an arsenal of intelligent algorithms and methods in the fields of Data Mining, Pattern Recognition and of Regression, Correlation and Dependence Analysis to educational content and students' usage data, which are continuously gathered, acquired, collected, accumulated, processed and enhanced by the system, and can provide accurate historic as well as current information in a wide range of cross-sections that best represents the many aspects of the education eco system of a given region and therefore be of utmost importance to decision making and problems/opportunities identification.

Students Usage Analytics (O-09) are insights, behavioral patterns and trends within students' groups, that are identified and deduced by the system, which are of value to a variety of organizations (institutions/departments of education, community services, corporations etc.), such as (i) recurring patterns of learning habits and learning curves during periods of time, by students of an educational institution, community, district or state, (ii) types of jobs that are most sought after by students that have attained certain achievement levels, within an educational institution, community, district or state, (iii) demand expectations for specific schoolbooks, textbooks and educational materials, and (iv) forecasted popularity and demand for education subjects, courses and study openings. Students Usage Analytics are derived by applying an arsenal of intelligent algorithms and methods in the fields of Data Mining, Pattern Recognition and of Regression, Correlation and Dependence Analysis to educational content and students' usage data that are continuously gathered, acquired, collected, accumulated, processed and enhanced by the system.

Reference is now also made to FIG. 9.1 illustrating an overview of a computerized system for identifying dynamic behavioral patterns of students, and to FIG. 9.3 which further illustrates a flow diagram of Dynamic Behavioral Patterns Identification operations that are depicted by block 9160 of FIG. 9.1, according to some embodiments of the invention. According to this embodiment, these operations include at least one of the following steps by the System Outputs: Generate the requested Education Analytics report (step 9330), generate the requested Students Usage Analytics report (step 9340).

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention. Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A system for analyzing behavioral education learning processes of students and providing automatically generated students-related information and services, said system comprising:

a computerized communication terminal comprising a network sharing application configured to (i) upload and share solutions to education exercises, requests for solutions of said exercises, learning queries and viewing solutions related to said exercises, and (ii) issue requests for analysis of personal behavioral education learning processes and view results of said analysis;

at least one network server wherein each of said a server module comprising at least one processor, operatively coupled to non-transitory computer readable storage devices, on which are stored modules of instruction code, wherein execution of said modules of instruction code by said at least one processor implements the following modules:

an education map database which is comprised of dedicated connected graphs data structures representing relations between entities of students, education learning sources, education subjects and solutions of educational exercises, and relations with entities of education institutes, learning curriculums, educational exercise per subject, students' learning queries and students' requests for learning solutions, wherein each entity has attributes defining its data and relations types;

a dynamic map updating module for receiving new entities records and data for creating new entities, updating entities' relations and entities' attributes, and for tracking students' learning queries and requests for solutions relating to education exercises over time, to automatically update students' learning progress related to educational exercises, subjects and curriculums, wherein the map objects are sampled, re-calculated and their properties are dynamically updated, including at least updating specific exercise's difficulty level property reflecting changes in the amount of demands for its solution by students, and wherein the dynamic updating includes performing self-refactoring, re-clustering and reorganization of relations between objects in the education map database including at least learning subjects, education exercises and learning programs, according to knowledge that is derived from users' activities including learning queries, requests for solutions and uploaded solutions to exercises;

a front end web crawler module that repeatedly crawls the web for relevant sites and new education related content for gathering web learning content and education related content for performing semantic analysis of this content, to identify its type, including newly published schoolbook, and to extract all the available associated data, including the schoolbook's subject, publisher, table of contents, wherein the processed data is normalized, formatted, for dynamic updating the educational map, as a uniform data structure according to its type, including at least one of: educational source, educational institutions data, or learning content request;

a dynamic map analyzing module configured to dynamically analyze learning processes of students by analyzing each student's behavioral activities over time of submitting learning queries, requests for solutions, and viewing solutions per educational exercises, related to an educational subject, education institutes, education learning sources and learning curriculum, wherein the student's behavioral activities include dynamically analyzing the histogram of time periods between requesting learning solutions, reading solutions, ranking solutions and commenting on solutions, wherein said analysis automatically provides:

custom study plans, which are targeted to reinforce students in any subject/topic, at any level, based on their learning achievement/progress, based on analyzing learning processes of students by analyzing each student's behavioral activities over time, ongoing identifying typical paths of students' navigations in the space of learning subjects and education exercises, to enable representing actual learning processes;

ongoing identifying and creating new associations between requests for solutions of exercises, learning queries and uploaded solutions for exercises to objects that are already in the education environments;

ongoing updating of new connections between a learning subject, and an educational source used for teaching this learning subject, and a new exercise belonging to this educational source, assessing of personal academic skills relative to peers by (i) using a set of rules to create a list of academic fields that correlate to the education subjects/topics of the given student, and then (ii) sorting the resulting list of academic fields according to the relative Achievement Levels that were calculated for the given student in the correlating education subjects/topics, dynamically identifying learning process of individuals and/or groups of students from the results of the analysis of behavioral education, performing statistical and pattern comparisons between current education learning processes of individuals and groups to historical analysis data, identifying repeating behavioral education behavior for identifying on ongoing learning processes of students, dynamically providing prioritized lists of academic opportunities identified by the crawler module including at least one of undergraduate courses' openings, seminars, extracurricular activities which are recommended to students, based on their personal academic skills assessments and the results of a gap analysis study which takes into account the various levels and weights of learning efforts, preparations, time and resources required from the student;

dynamically providing a prioritized list of links provided by the crawler module to practice educational exercises, previous exams, tutorial exercises which are targeted to reinforce students in subjects/topics that are included in the scopes of their exams, based on their personal achievement levels, wherein the educational exercises in the personal preparation and guidance plan for a specific exam scope and requirements are prioritized based on the student's specific skill and learning properties including at least one of weakness in absolute terms, of specified student in specified topics covered by the specific exam;

wherein the crawler module is responsible for ongoing configuring and activating of web crawlers/bots with at least one of white and black lists of web site addresses (URLs), students' forums, publishers, educational forums, education news and bulletins, wherein the crawler module controls web-reaping intervals for varying types of content and web sites, and semantic rules are applied for detecting information of items that are relevant to the education space at a current time period including at least one of current requests for learning solutions and learning shared solutions, updated published academic requirements and recommendations for an educational source;

wherein multiple learning content requests from users, learning queries, comments, and shared solutions are gathered through various entry points including at least one of: web service, email hub, and fax server, and are extracted through the entry points, processed, normalized, and formatted as a uniform data structure;

wherein the uniform data structure for a learning content request comprises (i) information that identifies a desired learning content item, including at least one of: related learning subject, textbook name, page number, and educational exercise number, and (ii) a set of parameters that identify the specific learning content item to which the learning content request relates, and (iii) a time stamp of when the learning content request was received, a user identification of its sender, and an entry point from which it was received;

wherein the uniform data structure for a shared learning solution comprises (i) properties of the shared learning solution, including at least one of: digital file type, format, and (ii) a set of parameters that identify the specific item within an educational source to which the learning content it contains relates, and (iii) a time stamp of when the learning solution was received, a user identification of its sender, and an entry point from which the learning solution was received.

2. The systems of claim 1, wherein the dynamic map updating module adds in missing information, which complements relationships of both connected and orphan entities, as new education data is accumulated, discovered or clarified, including updating and/or adding new connections between a learning subject, and an educational source used for teaching this learning subject.

3. The system of claim 1, wherein the analysis module uses gap analysis methods and behavioral patterns analysis methods on partial maps of actual learning processes in order to create sectoral reports, including at least one of education analytics, and students' usage analytics which provide behavioral patterns and trends.

* * * * *